United States Patent
Yurugi et al.

(10) Patent No.: US 6,767,980 B2
(45) Date of Patent: Jul. 27, 2004

(54) REACTIVE DILUENT AND CURABLE RESIN COMPOSITION

(75) Inventors: Keiji Yurugi, Osaka (JP); Akihiko Fukada, Nishinomiya (JP); Kenji Matsukawa, Osaka (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 10/125,604

(22) Filed: Apr. 19, 2002

(65) Prior Publication Data

US 2003/0199655 A1 Oct. 23, 2003

(51) Int. Cl.$^7$ .............................................. C08F 220/68
(52) U.S. Cl. ....................... 526/320; 526/219; 526/237; 526/272; 525/330.3; 525/330.4; 525/330.5; 525/387; 554/167; 554/223; 554/224; 554/227
(58) Field of Search ................................ 526/320, 219, 526/237, 272; 525/330.3, 330.4, 330.5, 387; 554/167, 223, 224, 227, 228; 560/221, 224; 568/616, 662, 675

(56) References Cited

U.S. PATENT DOCUMENTS

| | | | |
|---|---|---|---|
| 2,692,256 A | | 10/1954 | Bauer et al. |
| 4,629,676 A | * | 12/1986 | Hayakawa et al. ......... 430/203 |
| 5,055,357 A | * | 10/1991 | Plotkin et al. ............. 428/413 |
| 5,417,870 A | * | 5/1995 | Andrei et al. .............. 252/62.2 |
| 5,783,678 A | * | 7/1998 | Yurugi et al. ............... 536/18.2 |
| 5,834,576 A | * | 11/1998 | Nagano et al. ........... 526/318.3 |
| 6,191,229 B1 | * | 2/2001 | Sasabe et al. ................ 525/262 |
| 2001/0034300 A1 | * | 10/2001 | Yurugi et al. ................ 502/300 |
| 2002/0143120 A1 | * | 10/2002 | Yurugi et al. .................. 526/89 |

FOREIGN PATENT DOCUMENTS

| | | |
|---|---|---|
| EP | 0997508 A1 | 5/2000 |
| EP | 1201641 A2 | 5/2002 |
| GB | 976304 | 11/1964 |
| JP | 06-200204 | 7/1994 |
| JP | 09-183927 | 7/1997 |
| JP | 09-183928 | 7/1997 |
| JP | 10-182555 | 6/1999 |
| JP | 7-505439 | 10/1999 |
| JP | 2001-220364 | 8/2001 |
| WO | WO 97/31071 * | 8/1997 |
| WO | WO 00/59968 A1 | 10/2000 |

* cited by examiner

*Primary Examiner*—Tatyana Zalukaeva
(74) *Attorney, Agent, or Firm*—Sughrue Mion, PLLC

(57) ABSTRACT

The present invention provides a reactive diluent composition which overcomes drawbacks of both the radical-cure and the cationic-cure reactive diluents and can be applied in a broad variety of uses such as paints, inks, adhesives, pressure sensitive adhesives, surface-modifiers, and molding materials; a curable resin composition containing the same; an activated energy ray-curable resin composition; and an activated energy ray-curable ink composition for ink-jet printing.

A reactive diluent composition comprising a vinyl ether group-containing (meth)acrylic ester represented by the following general formula (1):

$$CH_2=CR^1—COO—R^2—O—CH=CH—R^3 \qquad (1)$$

wherein $R^1$ represents a hydrogen atom or a methyl group; $R^2$ represents an organic residue of 2 to 20 carbon atoms; $R^3$ represents a hydrogen atom or an organic residue of 1 to 11 carbon atoms and a hydroxyl group-containing polymerizable compound and/or divinyl ether.

5 Claims, No Drawings

REACTIVE DILUENT AND CURABLE RESIN COMPOSITION

FIELD OF THE INVENTION

The present invention relates to a reactive diluent composition, a curable resin composition containing the same, and uses of them. More particularly, the invention relates to a reactive diluent composition for curable resins which may be cured by heating or irradiation with an activated energy ray, a curable resin composition containing said reactive diluent composition, an activated energy ray-curable resin composition, and an activated energy ray-curable ink composition for ink-jet printing.

PRIOR ART

In the curing technology utilizing heat or an activated energy ray such as ultraviolet rays, an electron beam, or the like, a solventless curable composition employing a reactive diluent in lieu of the conventional organic solvent is attracting attention. Activated energy ray curing, in particular, is energy saving, space saving, and timesaving, to mention a few of its advantages, so that its scope of use is expanding.

Among constituent members of a curable resin composition, a polymerizable monomer used for reducing the viscosity and enhancing the adhesiveness of the resin composition, among other purposes, is known as a reactive diluent and a variety of such polymerizable monomers have been developed.

The reactive diluents so far developed can be classified into two types, namely the radical-cure type, represented by (meth)acrylic esters and vinyl compounds, and the cationic-cure type, represented by vinyl ethers, epoxy compounds, and alicyclic ethers.

But reactive diluents of the radical-cure type generally are disadvantageous in that 1) these are subject to the inhibition of polymerization by oxygen, 2) undergo a marked shrinkage in volume on curing, 3) have intense odors and a high skin-irritating potential, and 4) are somewhat poor in the adhesion to metals. Reactive diluents of the cationic cure type are disadvantageous in that 1) these are susceptible to polymerization inhibition due to moisture and bases, 2) the polymerization reaction continues to proceed even after the irradiation with ray (dark reaction), 3) the cationically curable resin and the catalyst required are expensive, and 4) the species commercially available are limited, among other drawbacks. Therefore, a reactive diluent free of the above disadvantages has been demanded.

Japanese Kohyo Publication Hei-07-505439 is directed to a radiation-curable coating composition comprising (a) a (meth)acryloyl group-containing polyfunctional acrylate oligomer or monomer; (b) a vinyl ether monomer, and (c) an effective amount of a free radical initiator. Thus, this literature discloses the use of a radically curable acrylate and a cationically curable vinyl ether in combination. But the mere such combination is unable to fully overcome the above-mentioned disadvantages of reactive diluents, and there is a room for devising.

SUMMARY OF THE INVENTION

Having been developed in the above state of the art, the present invention has a object to provide a reactive diluent composition which overcomes the drawbacks of both the radical-cure and the cationic-cure reactive diluents and can be applied in a broad variety of uses such as paints, inks, adhesives, pressure sensitive adhesives, surface modifiers, and molding materials; a curable resin composition containing the same; an activated energy ray-curable resin composition; and an activated energy ray-curable ink composition for ink-jet printing.

The inventors of the present invention made various investigations about reactive diluents and found that by using a vinyl ether group-containing (meth)acrylic ester containing a cationic-cure vinyl ether group and a radical-cure (meth)acryloyl group within each molecule and a hydroxyl-containing polymerizable compound and/or a divinyl ether in combination, not only the above-mentioned drawbacks of the radical-cure reactive diluent having only a radical-curable group and those of the cationic-cure reactive diluent having only a cationically curable group can be overcome but there can be obtained a cured artifact with better curability, improved adhesion to the substrate, and better surface hardness and solvent resistance than the cured artifact obtainable by using said radical-cure reactive diluent and cationic-cure reactive diluent as an admixture or by using a vinyl ether group-containing (meth)acrylic ester alone. It has also been found that even in the case of a reactive diluent composition comprising the vinyl ether group-containing (meth)acrylic ester of general formula (1), which is obtainable by subjecting a hydroxyl group-containing vinyl ether and a (meth)acrylic ester to transesterification reaction, said hydroxyl group-containing polymerizable compound and divinyl ether come into existence so that the same operation and effect as above can be obtained. Furthermore, a curable resin composition comprising such a reactive diluent composition comprising a vinyl ether group-containing (meth)acrylic ester and a hydroxyl group-containing polymerizable compound and/or a divinyl ether or a vinyl ether group-containing (meth) acrylic ester prepared by said transesterification reaction and a curable resin having at least one heat-curable or activated energy ray-curable polymeric group and an activated energy ray-curable resin composition comprising said reactive diluent composition are excellent in curability and can be improved adhesion, so that these can be used with advantage in various applications. Furthermore, it has been found that such reactive diluent compositions are suitable for use as an ingredient of the activated energy ray-curable ink for ink-jet printing use and that an activated energy ray-curable ink composition for ink-jet printing use which contains such a reactive diluent composition has many advantages such as low viscosity, low odor, low skin-irritating, good stability and high sensitivity to as well as excellent curability and is very satisfactory in post-printing fundamental characteristics. The present invention has been developed on the basis of the above findings.

While the curable resin for use in the present invention is comprised of a macromonomer or prepolymer, a form of the macromonomer or prepolymer is not particularly restricted but includes such as a solid (powder), a liquid and so forth. The preferred form of said reactive diluent composition is liquid (a liquid state) at 25° C.

DETAILED DESCRIPTION OF THE INVENTION

The present invention is now described in detail.

The reactive diluent composition according to the present invention comprises a vinyl ether group-containing (meth)acrylic ester represented by the following general formula (1):

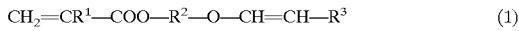

$$CH_2=CR^1—COO—R^2—O—CH=CH—R^3 \quad (1)$$

wherein $R^1$ represents a hydrogen atom or a methyl group; $R^2$ represents an organic residue of 2 to 20 carbon atoms; $R^3$ represents a hydrogen atom or an organic residue of 1 to 11 carbon atoms and a hydroxyl group-containing polymerizable compound.

The vinyl ether group-containing (meth)acrylic ester for use as a component of the reactive diluent composition according to the present invention may be any compound that can be represented by the above general formula (1), wherein the substituent $R^1$ is hydrogen or methyl, the substituent $R^2$ is an organic residue containing 2 to 20 carbon atoms, and the substituent $R^3$ is hydrogen or an organic residue containing 1 to 11 carbon atoms. Such vinyl ether group-containing (meth)acrylic esters can be used each independently or in a combination of two or more species.

The organic residue of 2 to 20 carbon atoms as represented by $R^2$ in the above general formula (1) is preferably a linear, branched, or cyclic alkylene group of 2 to 20 carbon atoms, an alkylene group of 2 to 20 carbon atoms and an oxygen atom in the form of an ether bond and/or an ester bond, or an aromatic group containing 6 to 11 carbon atoms which may optionally be substituted. Among these, an alkylene group of 2 to 6 carbon atoms or an alkylene group containing 2 to 9 carbon atoms and an oxygen atom in the form of an ether bond can be used with advantage.

The organic residue containing 1 to 11 carbon atoms as represented by $R^3$ in the above general formula (1) is preferably a linear, branched, or cyclic alkyl group or an aromatic group containing 6 to 11 carbon atoms which may optionally be substituted. Among such groups, an alkyl group of 1 or 2 carbon atoms or an aromatic group of 6 to 8 carbon atoms is preferred.

The preferred species of the vinyl ether group-containing (meth)acrylic ester of general formula (1) includes the following:

2-vinyloxyethyl (meth)acrylate; 3-vinyloxypropyl (meth)acrylate; 1-methyl-2-vinyloxyethyl(meth)acrylate; 2-vinyloxypropyl (meth)acrylate; 4-vinyloxybutyl (meth)acrylate; 1-methyl-3-vinyloxypropyl (meth)acrylate; 1-vinyloxymethylpropyl (meth)acrylate; 2-methyl-3-vinyloxypropyl (meth)acrylate; 3-methyl-3-vinyloxypropyl (meth)acrylate; 1,1-dimethyl-2-vinyloxyethyl (meth)acrylate; 3-vinyloxybutyl (meth)acrylate; 1-methyl-2-vinyloxypropyl (meth)acrylate; 2-vinyloxybutyl (meth)acrylate; 4-vinyloxycyclohexyl (meth)acrylate; 5-vinyloxypentyl (meth)acrylate; 6-vinyloxyhexyl (meth)acrylate; 4-vinyloxymethylcyclohexylmethyl (meth)acrylate, p-vinyloxymethylphenylmethyl (meth)acrylate; 2-(vinyloxyethoxy)ethyl (meth)acrylate; 2-(vinyloxyisopropoxy)ethyl (meth)acrylate; 2-(vinyloxyethoxy)propyl (meth)acrylate; 2-(vinyloxyethoxy)isopropyl (meth)acrylate; 2-(vinyloxyisopropoxy)propyl (meth)acrylate; 2-(vinyloxyisopropoxy)isopropyl (meth)acrylate; 2-(vinyloxyethoxyethoxy)ethyl (meth)acrylate; 2-(vinyloxyethoxyisopropoxy)ethyl (meth)acrylate; 2-(vinyloxyethoxyisopropoxy)propyl (meth)acrylate; 2-(vinyloxyethoxyethoxy)isopropyl (meth)acrylate; 2-(vinyloxyethoxyisopropoxy)isopropyl (meth) acrylate; 2-(vinyloxyethoxyethoxyethoxy)ethyl (meth) acrylate; polyethylene glycol monovinyl ether (meth)acrylate; and polypropylene glycol monovinyl ether (meth)acrylate.

Among these, 2-vinyloxyethyl (meth)acrylate; 3-vinyloxypropyl (meth)acrylate; 1-methyl-2-vinyloxyethyl (meth)acrylate, 2-vinyloxypropyl (meth)acrylate; 4-vinyloxybutyl (meth)acrylate; 4-vinyloxycyclohexyl (meth)acrylate; 5-vinyloxypentyl (meth)acrylate; 6-vinyloxyhexyl (meth)acrylate; 4-vinyloxymethylcyclohexylmethyl (meth)acrylate; p-vinyloxymethylphenylmethyl (meth)acrylate; 2-(vinyloxyethoxy)ethyl (meth)acrylate; 2-(vinyloxyethoxyethoxy)ethyl (meth)acrylate and 2-(vinyloxyethoxyethoxyethoxy)ethyl (meth)acrylate are particularly preferred.

The method for the production of the vinyl ether group-containing (meth)acrylic ester according to the present invention includes a method which comprises esterifying (meth)acrylic acid with a hydroxyl group-containing vinyl ether (Process A), a method which comprises subjecting a (meth)acrylic acid halide and a hydroxyl group-containing vinyl ether to esterification reaction (Process B), a method which comprises subjecting (meth)acrylic anhydride and a hydroxyl group-containing vinyl ether to esterification reaction (Process C), a method which comprises subjecting a (meth)acrylic ester and a hydroxyl group-containing vinyl ether to transesterification reaction (Process D), a method which comprises esterifying (meth)acrylic acid with a halogen-containing vinyl ether (Process E), and a method which comprises subjecting an alkali (or alkaline earth) metal salt of (meth)acrylic acid and a halogen-containing vinyl ether to esterification reaction (Process F), to mention but a few preferred methods. Among these, the method which comprises subjecting a (meth)acrylic ester and a hydroxyl group-containing vinyl ether to transesterification reaction (Process D) is particularly suitable and allows the effect of the present invention to be fully expressed. The reactive diluent composition comprising a vinyl ether group-containing (meth)acrylic ester produced by such a transesterification reaction constitutes a preferred embodiment of the present invention. The preferred protocol for said transesterification reaction will be described hereinafter.

The viscosity of the vinyl ether group-containing (meth) acrylic ester for use in the present invention is preferably 0.1 mPa·s to 1500 mPa·s at 25° C. If it is less than 0.1 mPa·s, not only may it be difficult to control thickness of the coat but also generally the volatility may be increased to adversely affect the working environment. If it exceeds 1500 mPa·s, the high viscosity tends to adversely affect the coating workability. The lower limit is preferably 0.2 mPa·s, more preferably 0.5 mPa·s, and the upper limit is preferably 1000 mPa·s, more preferably 500 mPa·s.

The molecular weight of the vinyl ether group-containing (meth)acrylic ester is preferably 140 to 2000. If it exceeds 2000, the high viscosity tends to adversely affect the coating workability. The upper limit is more preferably 1000, still more preferably 800, most preferably 500. Thus, the vinyl ether group-containing (meth)acrylic ester is preferably a compound having such viscosity and molecular weight.

The hydroxyl group-containing polymerizable compound for use as a component of the reactive diluent composition of the present invention is a compound having both at least one radical-polymerizable and/or ionic-polymerizable group and at least one hydroxyl (—OH) group within each molecule. Species of said hydroxyl group-containing polymerizable compound may be used each independently or in a combination of two or more species.

The hydroxyl group-containing polymerizable compound mentioned above is preferably one that is compatible with the vinyl ether group-containing (meth)acrylic ester.

As said hydroxyl group-containing polymerizable compound, the following compounds are preferred:

monofunctional hydroxyl group-containing (meth) acrylates, such as 2-hydroxyethyl (meth)acrylate, 3-hydroxypropyl (meth)acrylate, 1-methyl-2-hydroxyethyl (meth)acrylate, 2-hydroxypropyl (meth)acrylate, 4-hydroxybutyl (meth)acrylate, 4-hydroxycyclohexyl (meth)acrylate, 5-hydroxypentyl (meth)acrylate, 6-hydroxyhexyl (meth)acrylate, 4-hydroxymethylcyclohexylmethyl (meth)acrylate, p-hydroxymethylphenylmethyl (meth)acrylate, 2-(hydroxyethoxy)ethyl (meth)acrylate, 2-(hydroxyethoxyethoxy)ethyl (meth)acrylate, 2-(hydroxyethoxyethoxyethoxy)ethyl (meth)acrylate, methyl α-hydroxymethylacrylate, ethyl α-hydroxymethylacrylate, etc.; monofunctional hydroxyl group-containing vinyl ethers, such as 2-hydroxyethyl vinyl ether, 3-hydroxypropyl vinyl ether, 1-methyl-2-hydroxyethyl vinyl ether, 2-hydroxypropyl vinyl ether, 4-hydroxybutyl vinyl ether, 4-hydroxycyclohexyl vinyl ether, 5-hydroxypentyl vinyl ether, 6-hydroxyhexyl vinyl ether, 4-hydroxymethylcyclohexylmethyl vinyl ether, p-hydroxymethylphenylmethyl vinyl ether, 2-(hydroxyethoxy)ethyl vinyl ether, 2-(hydroxyethoxyethoxy)ethyl vinyl ether, 2-(hydroxyethoxyethoxyethoxy)ethyl vinyl ether, etc; monofunctional hydroxyl group-containing alicyclic ethers, such as glycidol, 3-methyl-3-hydroxymethyloxetane, 3-ethyl-3-hydroxymethyloxetane, etc.; polyfunctional hydroxyl group-containing (meth)acrylates, such as dipentaerythritol penta(meth)acrylate, ethylene oxide-added pentaerythritol tetra(meth)acrylate, etc.; polyfunctional hydroxyl group-containing vinyl ethers, such as dipentaerythritol pentavinyl ether, ethylene oxide-added pentaerythritol tetravinyl ether, etc.; and polyfunctional hydroxyl group-containing epoxy compounds, such as dipentaerythritol pentaglycidyl ether, ethylene oxide-added pentaerythritol tetraglycidyl ether, and so forth.

The more preferred, among these, is a compound represented by the following general formula (4):

$$Z-R^2-OH \quad (4)$$

(wherein Z represents $CH_2=CR^1-COO-$ or $R^3-CH=CH_2-O-$; $R^2$ represents an organic residue containing 2 to 20 carbon atoms; $R^3$ represents a hydrogen atom or an organic residue containing 1 to 11 carbon atoms). $R^1$, $R^2$ and $R^3$ in this general formula (4) have the same meanings as defined for $R^1$, $R^2$ and $R^3$, respectively, in the general formula (1).

The compound of the above general formula (4) includes such preferred species as 2-hydroxyethyl (meth)acrylate, 3-hydroxypropyl (meth)acrylate, 1-methyl-2-hydroxyethyl (meth)acrylate, 2-hydroxypropyl (meth)acrylate, 4-hydroxybutyl (meth)acrylate, 4-hydroxycyclohexyl (meth)acrylate, 5-hydroxypentyl (meth)acrylate, 6-hydroxyhexyl (meth)acrylate, 4-hydroxymethylcyclohexylmethyl (meth)acrylate, p-hydroxymethylphenylmethyl (meth)acrylate, 2-(hydroxyethoxy)ethyl (meth)acrylate, 2-(hydroxyethoxyethoxy)ethyl (meth)acrylate, 2-(hydroxyethoxyethoxyethoxy)ethyl (meth)acrylate, 2-hydroxyethyl vinyl ether, 3-hydroxypropyl vinyl ether, 1-methyl-2-hydroxyethyl vinyl ether, 2-hydroxypropyl vinyl ether, 4-hydroxybutyl vinyl ether, 4-hydroxycyclohexyl vinyl ether, 5-hydroxypentyl vinyl ether, 6-hydroxyhexyl vinyl ether, 4-hydroxymethylcyclohexylmethyl vinyl ether, p-hydroxymethylphenylmethyl vinyl ether, 2-(hydroxyethoxy)ethyl vinyl ether, 2-(hydroxyethoxyethoxy)ethyl vinyl ether, and 2-(hydroxyethoxyethoxyethoxy)ethyl vinyl ether.

The viscosity of the hydroxyl group-containing polymerizable compound for use in the present invention is preferably 0.1 mPa·s to 1500 mPa·s at 25° C. If it is less than 0.1 mPa·s, not only may it be difficult to control thickness of the coat but also generally the volatility will be increased to adversely affect the working environment. If it exceeds 1500 mPa·s, the high viscosity tends to adversely affect the coating workability. The lower limit is preferably 0.2 mPa·s, more preferably 0.5 mPa·s, and the upper limit is preferably 1,000 mPa·s, more preferably 500 mPa·s.

The molecular weight of the hydroxyl group-containing polymerizable compound is preferably 74 to 2,000. If it exceeds 2,000, the high viscosity tends to adversely affect the coating workability. The upper limit is more preferably 1,000, still more preferably 800, most preferably 500. Thus, the hydroxyl group-containing polymerizable compound is preferably a compound having such viscosity and molecular weight.

In the present invention, the proportions of said vinyl ether group-containing (meth)acrylic ester and said hydroxyl group-containing polymerizable compound in the reactive diluent composition maybe liberally selected but the preferred proportion of the hydroxyl group-containing polymerizable compound relative to 100 mass parts of the vinyl ether group-containing (meth)acrylic ester is not less than 0.001 mass parts and not more than 100 mass parts. If it is less than 0.001 mass parts, the curability-improving effect tends to be insufficient. If it exceeds 100 mass parts, the water resistance of the cured artifact tends to be decreased. The lower limit is more preferably 0.005 mass parts, still more preferably 0.01 mass parts, further more preferably 0.02 mass parts, most preferably 0.03 mass parts. The upper limit is more preferably 70 mass parts, still more preferably 50 mass parts, further more preferably 30 mass parts, and most preferably 10 mass parts.

In the present invention, the combined proportion of the vinyl ether group-containing (meth)acrylic ester and hydroxyl group-containing polymerizable compound in the reactive diluent composition can be judiciously selected according to the species and combination of vinyl ether group-containing (meth)acrylic ester and hydroxyl group-containing polymerizable compound and the intended use of the reactive diluent composition. But based on 100 mass parts of the reactive diluent composition, the lower limit of said combined proportion is preferably 1 mass part, more preferably 2 mass parts, still more preferably 3 mass parts, most preferably 4 mass parts. On the other hand, the upper limit is preferably 100 mass parts, more preferably 95 mass parts, still more preferably 90 mass parts, and most preferably 85 mass parts.

The reactive diluent composition comprising said vinyl ether group-containing (meth)acrylic ester and hydroxyl group-containing polymerizable compound according to the present invention, in the case where it further contains a divinyl ether of the following general formula (5):

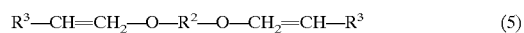

$$R^3-CH=CH_2-O-R^2-O-CH_2=CH-R^3 \quad (5)$$

wherein $R^2$ represents an organic residue containing 2 to 20 carbon atoms; the $R^3$ groups may be the same or different and each represents a hydrogen atom or an organic residue containing 1 to 11 carbon atoms, features excellent curability and adhesion to a substrate and provides a cured artifact with very satisfactory surface hardness and solvent resistance. The divinyl ether may be used one species independently or in a combination of two or more species.

The divinyl ether mentioned above is preferably one compatible with said vinyl ether group-containing (meth) acrylic ester and hydroxyl group-containing polymerizable compound.

Referring to the above general formula (5), $R^2$ and $R^3$ have the same meanings as $R^2$ and $R^3$, respectively, in the general formula (1) mentioned above.

As said divinyl ether, the following compounds are preferred:

ethylene glycol divinyl ether, 1,3-propanediol divinyl ether, propylene glycol divinyl ether, 1,4-butanediol divinyl ether, 1,3-butanediol divinyl ether, 1,2-butanediol divinyl ether, 2,3-butanediol divinyl ether, 1-methyl-1,3-propanediol divinyl ether, 2-methyl-1,3-propanediol divinyl ether, 2-methyl-1,2-propanediol divinyl ether, 1,5-pentanediol divinyl ether, 1,6-hexanediol divinyl ether, cyclohexane-1,4-diol divinyl ether, cyclohexane-1,4-dimethanol divinyl ether, p-xylene glycol divinyl ether, diethylene glycol divinyl ether, triethylene glycol divinyl ether, tetraethylene glycol divinyl ether, polyethylene glycol divinyl ether, dipropylene glycol divinyl ether, tripropylene glycol divinyl ether, tetrapropylene glycol divinyl ether, polypropylene glycol divinyl ether, and (ethylene glycol-propylene glycol) copolymer divinyl ether.

The preferred, among these, are ethylene glycol divinyl ether, 1,3-propanediol divinyl ether, propylene glycol divinyl ether, 1,4-butanediol divinyl ether, 1,5-pentanediol divinyl ether, 1,6-hexanediol divinyl ether, cyclohexane-1,4-diol divinyl ether, cyclohexane-1,4-dimethanol divinyl ether, p-xylene glycol divinyl ether, diethylene glycol divinyl ether, triethylene glycol divinyl ether, and tetraethylene glycol divinyl ether.

The viscosity of the divinyl ether is preferably 0.1 mPa·s to 1,500 mPa·s at 25° C. If it is less than 0.1 mPa·s, not only may it be difficult to control thickness of the coat but also generally the volatility will be increased to adversely affect the working environment. If it exceeds 1,500 mPa·s, the high viscosity tends to adversely affect the coating workability. The lower limit is preferably 0.2 mPa·s, more preferably 0.5 mPa·s, and the upper limit is preferably 1,000 mPa·s, more preferably 500 mPa·s.

The molecular weight of the divinyl ether is preferably 114 to 2,000. If it exceeds 2,000, the high viscosity tends to adversely affect the coating workability. The upper limit is more preferably 1000, still more preferably 800, most preferably 500.

Regarding the level of presence of said divinyl ether in the reactive diluent composition comprising said vinyl ether group-containing (meth)acrylic ester and hydroxyl group-containing polymerizable compound, based on 100 mass parts of the vinyl ether group-containing (meth)acrylic ester, the lower limit is preferably 0.001 mass parts and the upper limit is preferably 100 mass parts. If it exceeds 100 mass parts, sufficient curability may not be obtained. The lower limit is more preferably 0.005 mass parts, still more preferably 0.01 mass parts, further more preferably 0.02 mass parts, most preferably 0.03 mass parts. The upper limit is more preferably 70 mass parts, still more preferably 50 mass parts, further more preferably 30 mass parts, and most preferably 10 mass parts.

The reactive diluent composition comprising said vinyl ether group-containing (meth)acrylic ester and hydroxyl group-containing polymerizable compound according to the present invention, in the case where it further contains a di(meth)acrylate compound of the following general formula (6):

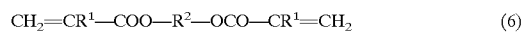

$$CH_2=CR^1-COO-R^2-OCO-CR^1=CH_2 \qquad (6)$$

wherein $R^1$ represents a hydrogen atom or a methyl group; $R^2$ represents an organic residue containing 2 to 20 carbon atoms, features excellent curability and adhesion to a substrate and provides a cured artifact with very satisfactory surface hardness and solvent resistance. The di(meth)acrylate compound may be used one species independently or in a combination of two or more species.

The di(meth)acrylate compound mentioned above is preferably one compatible with said vinyl ether group-containing (meth)acrylic ester and hydroxyl group-containing polymerizable compound.

Referring to the above general formula (6), $R^1$ and $R^2$ have the same meanings as $R^1$ and $R^2$, respectively, in the general formula (1) mentioned above.

As said di(meth)acrylate compound, the following compounds are preferred:

ethylene glycol di(meth)acrylate, 1,3-propanediol di(meth)acrylate, propylene glycol di(meth)acrylate, 1,4-butanediol di(meth)acrylate, 1,3-butanediol di(meth)acrylate, 1,2-butanediol di(meth)acrylate, 2,3-butanediol di(meth)acrylate, 1-methyl-1,3-propanediol di(meth)acrylate, 2-methyl-1,3-propanediol di(meth)acrylate, 2-methyl-1,2-propanediol di(meth)acrylate, 1,5-pentanediol di(meth)acrylate, 1,6-hexanediol di(meth)acrylate, cyclohexane-1,4-diol di(meth)acrylate, cyclohexane-1,4-dimethanol di(meth)acrylate, p-xylene glycol di(meth)acrylate, diethylene glycol di(meth)acrylate, triethylene glycol di(meth)acrylate, tetraethylene glycol di(meth)acrylate, polyethylene glycol di(meth)acrylate, dipropylene glycol di(meth)acrylate, tripropylene glycol di(meth)acrylate, tetrapropylene glycol di(meth)acrylate, and (ethylene glycol-propylene glycol) copolymer di(meth)acrylate.

The preferred, among these, are ethylene glycol di(meth)acrylate, 1,3-propanediol di(meth)acrylate, propylene glycol di(meth)acrylate, 1,4-butanediol di(meth)acrylate, 1,5-pentanediol di(meth)acrylate, 1,6-hexanediol di(meth)acrylate, cyclohexane-1,4-diol di(meth)acrylate, cyclohexane-1,4-dimethanol di(meth)acrylate, p-xylene glycol di(meth)acrylate, diethylene glycol di(meth)acrylate, triethylene glycol di(meth)acrylate, and tetraethylene glycol di(meth)acrylate.

The viscosity of the di(meth)acrylate compound is preferably 0.1 mPa·s to 1,500 mPa·s at 25° C. If it is less than 0.1 mPa·s, not only may it be difficult to control thickness of the coat but also generally the volatility will be increased to adversely affect the working environment. If it exceeds 1,500 mPa·s, the high viscosity tends to adversely affect the coating workability. The lower limit is preferably 0.2 mPa·s, more preferably 0.5 mPa·s, and the upper limit is preferably 1,000 mPa·s, more preferably 500 mPa·s.

The molecular weight of the di(meth)acrylate compound is preferably 170 to 2,000. If it exceeds 2,000, the high viscosity tends to adversely affect the coating workability.

The upper limit is more preferably 1,000, still more preferably 800, most preferably 500.

Regarding the level of presence of said di(meth)acrylate compound in the reactive diluent composition comprising said vinyl ether group-containing (meth)acrylic ester and hydroxyl group-containing polymerizable compound, based on 100 mass parts of the vinyl ether group-containing (meth)acrylic ester, the lower limit is preferably 0.001 mass parts and the upper limit is preferably 100 mass parts. If it exceeds 100 mass parts, embrittlement of the cured artifact tends to take place. The lower limit is more preferably 0.005 mass parts, still more preferably 0.01 mass parts, further more preferably 0.02 mass parts, most preferably 0.03 mass parts. The upper limit is more preferably 70 mass parts, still more preferably 50 mass parts, further more preferably 30 mass parts, and most preferably 10 mass parts.

In the present invention, the vinyl ether group-containing (meth)acrylic ester and the hydroxyl group-containing polymerizable compound may be used in combination with a polymerizable monomer or monomers other than these compounds. Such polymerizable monomers need only be monomers compatible with said vinyl ether group-containing (meth)acrylic ester and hydroxyl group-containing polymerizable compound and can be judiciously selected from among monofunctional and polyfunctional radical-polymerizable and/or ionic-polymerizable compounds and used one species alone or in combination of two or more species. Such polymerizable monomers other than said vinyl ether group-containing (meth)acrylic ester and hydroxyl group-containing polymerizable compound are preferably liquid substances having viscosities not over 1,000 mPa·s at 25° C.

The preferred polymerizable monomer other than the vinyl ether group-containing (meth)acrylic esters and hydroxyl group-containing polymerizable compounds mentioned above includes the following compounds:

a variety of monofunctional (meth)acrylates, such as methyl (meth)acrylate, ethyl (meth)acrylate, butyl (meth)acrylate, 2-ethylhexyl (meth)acrylate, cyclohexyl (meth)acrylate, methoxyethyl (meth)acrylate, methoxylated polyethylene glycol (meth)acrylate, (meth)acrylic acid, N,N-dimethylaminoethyl (meth)acrylate, etc.; monofunctional (meth)acrylamides, such as N,N-dimethyl(meth)acrylamide, N-methylol (meth)acrylamide, etc.; monofunctional vinyl ethers, such as methyl vinyl ether, ethyl vinyl ether, butyl vinyl ether, 2-ethylhexyl vinyl ether, cyclohexyl vinyl ether, methoxyethyl vinyl ether, methoxylated polyethylene glycol vinyl ether, etc.; monofunctional N-vinyl compounds, such as N-vinylpyrrolidone, N-vinylcaprolactam, N-vinylformamide, N-vinylacetamide, etc.; monofunctional vinyl compounds, such as styrene, α-methylstyrene, vinyl acetate, etc.; monofunctional α, β-unsaturated compounds, such as maleic anhydride, maleic acid, dimethyl maleate, diethyl maleate, fumaric acid, dimethyl fumarate, diethyl fumarate, monomethyl fumarate, monoethyl fumarate, itaconic anhydride, itaconic acid, dimethyl itaconate, methylenemalonic acid, dimethyl methylenemalonate, cinnamic acid, methyl cinnamate, crotonic acid, methyl crotonate, etc.; monofunctional epoxy compounds such as methyl glycidyl ether, ethyl glycidyl ether, butyl glycidyl ether, 2-ethylhexyl glycidyl ether, cyclohexyl glycidyl ether, methoxyethyl glycidyl ether, etc.; monofunctional alicyclic ethers, such as 3-methyl-3-phenoxymethyloxetane, 3-ethyl-3-phenoxymethyloxetane, 3-ethyl-3-(2-ethylhexyloxymethyl)oxetane, etc.; polyfunctional (meth)acrylates, such as trimethylolpropane tri(meth)acrylate, ditrimethylolpropane tetra(meth)acrylate, glycerol tri(meth)acrylate, etc.; polyfunctional vinyl ethers, such as trimethylolpropane trivinyl ether, ditrimethylolpropane tetravinyl ether, glycerol trivinyl ether, etc.; polyfunctional vinyl compounds, such as divinylbenzene etc.; polyfunctional epoxy compounds, such as ethylene glycol diglycidyl ether, diethylene glycol diglycidyl ether, polyethylene glycol diglycidyl ether, butylene glycol diglycidyl ether, hexanediol diglycidyl ether, bisphenol A-alkylene oxide diglycidyl ether, bisphenol F-alkylene oxide diglycidyl ether, trimethylolpropane triglycidyl ether, glycerol triglycidyl ether, etc.; and polyfunctional alicyclic ethers, such as di[1-methyl(3-oxentanyl)]methyl ether, di[1-ethyl(3-oxetanyl)]methyl ether, 1,4-bis{[(3-methyl-3-oxetanyl)methoxy]methyl}benzene, bis{4-[(3-ethyl-3-oxetanyl)methoxy]methyl}benzyl ether, and so forth.

The preferred, among these, are methyl (meth)acrylate, butyl (meth)acrylate, 2-ethylhexyl (meth)acrylate, methoxypolyethylene glycol (meth)acrylate, (meth)acrylic acid, butyl vinyl ether, cyclohexyl vinyl ether, maleic anhydride, maleic acid, dimethyl maleate, and diethyl maleate.

The method of producing the reactive diluent composition of the invention is not particularly restricted but should be such that the composition ultimately obtained thereby contains said vinyl ether group-containing (meth)acrylic ester and hydroxyl group-containing polymerizable compound, as essential components, and, if necessary, further contains optional components such as said divinyl ether, di(meth) acrylate, polymerizable monomer, etc. The referred, however, are the following methods.

(1) The production method which comprises blending the pure form of said vinyl ether group-containing (meth)acrylic ester, the pure form of said hydroxyl group-containing polymerizable compound, and, if necessary, said optional components.

(2) The production method which comprises subjecting a hydroxyl group-containing vinyl ether represented by the following general formula (2):

$$R^3\text{—}CH\!=\!CH\text{—}O\text{—}R^2\text{—}OH \qquad (2)$$

wherein $R^2$ represents an organic residue of 2 to 20 carbon atoms; $R^3$ represents a hydrogen atom or an organic residue containing 1 to 11 carbon atoms, and a (meth)acrylic ester of the following general formula (3):

$$CH_2\!=\!CR^1\text{—}COOR^4 \qquad (3)$$

wherein $R^1$ represents a hydrogen atom or a methyl group; $R^4$ represents an organic residue of 1 to 6 carbon atoms, to transesterification reaction in the presence of a catalyst to synthesize a vinyl ether group-containing (meth)acrylic ester of the above-mentioned general formula (1) and purifying the reaction product to give a reactive diluent composition comprising said vinyl ether group-containing (meth)acrylic ester and hydroxyl group-containing vinyl ether of general formula (2).

The preferred, among them, is the latter method (2). The preferred mode of practice is that, in the purification stage, said reactive diluent composition comprising said vinyl ether group-containing (meth)acrylic ester and said hydroxyl group-containing vinyl ether of general formula (2) is recovered from a distillation tower top.

The present invention is further directed to the reactive diluent composition comprising said vinyl ether group-containing (meth)acrylic ester of the above-mentioned general formula (1) and said divinyl ether. Like the reactive diluent composition mentioned above, this reactive diluent composition also features good curability and adhesion to a substrate and gives a cured artifact having excellent surface hardness and solvent resistance. The vinyl ether group-containing (meth)acrylic ester and divinyl ether mentioned above may each be a single species or a mixture of two or more species.

The vinyl ether group-containing (meth)acrylic ester of general formula (1) and its preferred species are the same as those mentioned hereinbefore. The divinyl ether is preferably one represented by the above-mentioned general formula (5), and by using it, the effect of the invention can be fully expressed. The divinyl ether and its preferred species are as mentioned hereinbefore.

In the present invention, the proportions of said vinyl ether group-containing (meth)acrylic ester and said divinyl ether in the reactive diluent composition may be liberally selected but the preferred proportion of the divinyl ether relative to 100 mass parts of the vinyl ether group-containing (meth)acrylic ester is not less than 0.001 mass parts and not more than 100 mass parts. If it is less than 0.001 mass parts, the curability-improving effect tends to be insufficient. If it exceeds 100 mass parts, the water resistance of the cured artifact tends to be decreased. The lower limit is more preferably 0.005 mass parts, still more preferably 0.001 mass parts, furthermore preferably 0.02 mass parts, most preferably 0.03 mass parts. The upper limit is more preferably 70 mass parts, still more preferably 50 mass parts, further more preferably 30 mass parts, and most preferably 10 mass parts.

In the present invention, the combined proportion of the vinyl ether group-containing (meth)acrylic ester and divinyl ether in the reactive diluent composition can be judiciously selected according to the species and combination of vinyl ether group-containing (meth)acrylic ester and divinyl ether and the intended use of the reactive diluent composition. But based on 100 mass parts of the reactive diluent composition, the lower limit of said combined proportion is preferably 1 mass part, more preferably 2 mass parts, still more preferably 3 mass parts, most preferably 4 mass parts. On the other hand, the upper limit is preferably 100 mass parts, more preferably 95 mass parts, still more preferably 90 mass parts, and most preferably 85 mass parts.

In the present invention, the reactive diluent composition preferably contains not only said vinyl ether group-containing (meth)acrylic ester and divinyl ether but also said hydroxyl group-containing polymerizable compound and/or a di(meth)acrylate.

Regarding the level of presence of said hydroxyl group-containing polymerizable compound in the reactive diluent composition comprising said vinyl ether group-containing (meth)acrylic ester and divinyl ether, based on 100 mass parts of the vinyl ether group-containing (meth)acrylic ester, the lower limit is preferably 0.001 mass parts and the upper limit is preferably 100 mass parts. If it exceeds 100 mass parts, sufficient curability may not be obtained. The lower limit is more preferably 0.005 mass parts, still more preferably 0.01 mass parts, further more preferably 0.02 mass parts, most preferably 0.03 mass parts. The upper limit is more preferably 70 mass parts, still more preferably 50 mass parts, further, more preferably 30 mass parts, and most preferably 10 mass parts.

Regarding the level of presence of said di(meth)acrylate compound in the reactive diluent composition comprising said vinyl ether group-containing (meth)acrylic ester and divinyl ether, based on 100 mass parts of the vinyl ether group-containing (meth)acrylic ester, the lower limit is preferably 0.001 mass parts and the upper limit is preferably 100 mass parts. If it exceeds 100 mass parts, embrittlement of the cured artifact tends to take place. The lower limit is more preferably 0.005 mass parts, still more preferably 0.01 mass parts, further more preferably 0.02 mass parts, most preferably 0.03 mass parts. The upper limit is more preferably 70 mass parts, still more preferably 50 mass parts, furthermore preferably 30 mass parts, and most preferably 10 mass parts.

The reactive diluent composition comprising said vinyl ether group-containing (meth)acrylic ester and divinyl ether may further contain one or more members selected from the group consisting of said polymerizable monomer and other components. The hydroxyl group-containing polymerizable compound, di(meth)acrylate compound, and polymerizable monomer, and the preferred species thereof are similar to those mentioned hereinbefore.

The method of producing the reactive diluent composition of the invention is not particularly restricted but should be such that the composition ultimately obtained thereby contains said vinyl ether group-containing (meth)acrylic ester and divinyl ether, as essential components, and, if necessary, further contains said hydroxyl group-containing polymerizable compound, di(meth)acrylate compound, polymerizable monomer, etc. as optional components. The preferred, however, are the following methods.

(1) The production method which comprises blending the pure form of said vinyl ether group-containing (meth)acrylic ester, the pure form of said divinyl ether, and, if necessary, said optional components.

(2) The production method in which a reactive diluent composition containing said vinyl ether group-containing (meth)acrylic ester, divinyl ether, etc. is produced by substantially the same procedure as the production method (2) mentioned earlier.

The preferred is the latter method (2). The preferred mode of practice is that, in the purification stage, said reactive diluent composition comprising said vinyl ether group-containing (meth)acrylic ester and said divinyl ether is recovered from a distillation tower top.

While the present invention is directed to the reactive diluent composition comprising said vinyl ether group-containing (meth)acrylic ester of the general formula (1) mentioned above, said vinyl ether group-containing (meth)acrylic ester being obtained by reacting a hydroxyl group-containing vinyl ether represented by the following general formula (2):

$$R^3-CH=CH-O-R^2-OH \tag{2}$$

wherein $R^2$ represents an organic residue containing 2 to 20 carbon atoms; $R^3$ represents a hydrogen atom or an organic residue containing 1 to 11 carbon atoms with a (meth)acrylic ester of the following general formula (3):

$$CH_2=CR^1-COOR^4 \tag{3}$$

wherein $R^1$ represents a hydrogen atom or a methyl group; $R^4$ represents an organic residue containing 1 to 6 carbon atoms, is also a reactive diluent composition according to the invention. Like the reactive diluent composition mentioned earlier, this latter reactive diluent composition also features good curability and adhesion to a substrate and gives a cured artifact having excellent surface hardness and solvent resistance.

The vinyl ether group-containing (meth)acrylic ester of the invention is represented by the above general formula (1) and its preferred species are the same as those mentioned hereinbefore. While the vinyl ether group-containing (meth) acrylic ester for use in the invention is produced by subjecting a hydroxyl group-containing vinyl ether of general formula (2) and a (meth)acrylic ester of general formula (3) to transesterification reaction, it is preferable that the reaction product contains not only the objective vinyl ether group-containing (meth)acrylic ester but also the unreacted hydroxyl group-containing vinyl ether and the divinyl ether, di(meth)acrylate and other byproducts formed during the transesterification and/or in the subsequent course of purification. Thus, starting material, the conditions of transesterification, and purification conditions are preferably selected so as to insure that the reaction product will contain said various compounds, whereby the benefit due to the effect of the invention can be fully expressed. Particularly preferred is the case in which the reaction product contains not only said vinyl ether group-containing (meth)acrylic ester but also the unreacted hydroxyl group-containing vinyl ether and/or the divinyl ether formed in the course of transesterification or purification. Furthermore, the reactive diluent composition may contain one or more species of said polymerizable monomer.

The preferred level of presence and forms of said vinyl ether group-containing (meth)acrylic ester, hydroxyl group-containing polymerizable compound, divinyl ether and di(meth)acrylate are the same as those for the reactive diluent composition mentioned hereinbefore.

The starting alcohol material for the transesterification reaction in accordance with the present invention is the hydroxyl group-containing vinyl ether. This hydroxyl group-containing vinyl ether need only be a compound which can be represented by the above-mentioned general formula (2), wherein the substituent group $R^3$ is a hydrogen atom or an organic residue of 1 to 11 carbon atoms and the substituent group $R^2$ is an organic residue of 2 to 20 carbon atoms.

The above $R^2$ and $R^3$ are the same as the $R^2$ and $R^3$ defined in the general formula (1) mentioned above. The preferred compounds of general formula (2) are said monofunctional hydroxyl group-containing vinyl ethers, which may be used each alone or in a combination of two or more species.

The (meth)acrylic ester for use as a starting material according to the invention need only be a compound having the above-mentioned general formula (3), wherein the substituent group $R^1$ is a hydrogen atom or a methyl group and the substituent group $R^4$ is an organic residue of 1 to 6 carbon atoms.

The organic residue $R^4$ in the above general formula (3) is preferably a $C_{1-6}$ linear, branched or cyclic alkyl group or a phenyl group. Among these, $C_{1-4}$ alkyl groups are particularly preferred.

The (meth)acrylic ester represented by the foregoing general formula (3) includes lower alkyl esters of (meth) acrylic acid, such as methyl (meth)acrylate, ethyl (meth) acrylate, propyl (meth)acrylate, isopropyl (meth)acrylate, butyl (meth)acrylate, isobutyl (meth)acrylate, sec-butyl (meth)acrylate, t-butyl (meth)acrylate, and so forth. These may be used each alone or in a combination of two or more species.

The above-mentioned transesterification is preferably conducted in the presence of a transesterification catalyst. Moreover, the reaction byproduct alcohol is preferably removed away from the reaction system.

Regarding the reaction molar ratio of said (meth)acrylic ester to said hydroxyl group-containing vinyl ether in the above transesterification, the molar ratio of (meth)acrylic ester/hydroxyl group-containing vinyl ether is preferably 6/1 to 1/5, more preferably 5/1 to 1/3, still more preferably 4/1 to 1/2, and most preferably 3/1 to 1/1. The above range of molar ratio is favorable in terms of yield and economics.

The transesterification catalyst mentioned above includes various oxides, such as calcium oxide, zinc oxide, zirconium oxide, etc.; hydroxides, such as potassium hydroxide, sodium hydroxide, calcium hydroxide, tin hydroxide, etc.; halides such as lithium chloride, calcium chloride, tin chloride, lead chloride, zirconium chloride, etc.; carbonates, such as potassium carbonate, cesium carbonate, lead carbonate, etc.; hydrogen carbonates, such as potassium hydrogen carbonate, cesium hydrogen carbonate, etc.; phosphates, such as sodium phosphate, potassium phosphate, zinc phosphate, etc.; nitrates, such as lithium nitrate, calcium nitrate, lead nitrate, etc.; carboxylate salts, such as lithium acetate, calcium acetate, lead acetate, etc.; alkoxy compounds, such as sodium methoxide, sodium ethoxide, potassium ethoxide, calcium methoxide, tetraethoxytitanium, tetrabutoxytitanium, etc.; acetylacetonato complexes, such as lithium acetylacetonate, zirconia acetylacetonate, zinc acetylacetonate, dibutoxytin acetylacetonate, dibutoxytitanium acetylacetonate, etc.; quaternary ammonium alkoxides, such as tetramethylammonium ethoxide, trimethylbenzylammonium ethoxide, etc.; dialkyltin compounds, such as dimethyltin oxide, dibutyltin oxide, dioctyltin oxide, etc.; distanoxanes, such as bis (dibutyltin acetate) oxide, bis(dibutyltin laurate) oxide etc.; and dialkyltin dicarboxylates, such as dibutyltin diacetate, dibutyltin dilaurate, and so forth. These may be used each alone or in a combination of two or more species.

The preferred, among the above-mentioned transesterification catalysts, are potassium carbonate, cesium carbonate, tetraethoxytitanium, tetrabutoxytitanium, tetra(2-ethylhexanoxy)titanium, zirconia acetylacetonate, dibutyltin oxide, dioctyltin oxide, bis(dibutyltin acetate) oxide, bis (dibutyltin laurate) oxide, dibutyltin diacetate, and dibutyltin dilaurate.

The level of use of said transesterification catalyst, based on the hydroxyl group-containing vinyl ether of general formula (2), is preferably not less than 0.001 mol %, more preferably not less than 0.005 mol %, still more preferably not less than 0.01 mol %, most preferably not less than 0.05 mol %. Moreover, it is preferably not more than 20 mol %, more preferably not more than 15 mol %, still more preferably not more than 10 mol %, and most preferably not more than 5 mol %. The above range of use for the transesterification catalyst is favorable in terms of yield and economics.

The preferred method for removal of the said byproduct alcohol includes the reaction conducted under reduced pressure, the reaction conducted using an azeotropic solvent, and the reaction conducted in the presence of an adsorbent. The more preferred, among these, are the reaction conducted under reduced pressure and the reaction conducted using an azeotropic solvent.

The azeotropic solvent mentioned above need only be one which does not inhibit the reaction, thus including various ethers, such as diethyl ether, diisopropyl ether, dibutyl ether, etc.; aromatic hydrocarbons, such as benzene, toluene, xylene, etc.; aliphatic hydrocarbons, such as pentane, hexane, heptane, cyclohexane, etc.; and halogenated hydrocarbons, such as chloroform, methylene chloride, 1,2-dichloroethane, chlorobenzene, and so forth. These may be used each alone or in a combination of two or more species.

The level of use of said azeotropic solvent is preferably 0 mass % or more relative to the total combined mass of said (meth)acrylic ester of general formula (3) and said hydroxyl group-containing vinyl ether of general formula (2). It is also preferably not more than 300 mass %, more preferably not more than 200 mass %, still more preferably not more than 150 mass %, most preferably not more than 100 mass %, again based on said total combined mass of said (meth) acrylic ester of general formula (3) and hydroxyl group-containing vinyl ether of general formula (2). The above range for the azeotrope-forming organic solvent is favorable in terms of yield and economics.

It is to be understood that said (meth)acrylic ester may be used in excess so that it may double as the azeotropic solvent.

The reaction temperature for the above reaction is preferably not lower than the boiling point of the byproduct alcohol or the azeotropic distillation temperature. More particularly, it is preferably not lower than 40° C., more preferably not lower than 50° C., most preferably not lower than 60° C. On the other hand, it is preferably not over 180° C., more preferably not over 170° C., most preferably not over 160° C. The reaction pressure may be whichever of atmospheric, pressurized, and reduced pressure. The reaction time may be judiciously selected so that the above reaction may go to completion within that time.

In the production of said vinyl ether group-containing (meth)acrylic ester of general formula (1), the reaction is preferably conducted in the presence of a polymerization inhibitor to control polymerization from the standpoint of yield. As the polymerization inhibitor, the inhibitors mentioned hereinafter can be suitably used, either each alone or in a combination of two or more species.

The level of use of the polymerization inhibitor depends on the species of (meth)acrylic ester of general formula (3) to be used and that of vinyl ether group-containing (meth) acrylic ester of the general formula (1) to be produced but, based on the (meth)acrylic ester of general formula (3), the inhibitor is generally used at the level of preferably not less than 0.0001 mass %, more preferably not less than 0.0002 mass %, still more preferably not less than 0.0005 mass %, most preferably not less than 0.001 mass %. As to the upper limit, the inhibitor is used at the level of preferably not more than 5 mass %, more preferably not more than 1 mass %, still more preferably not more than 0.5 mass %, most preferably not more than 0.1 mass %. The above range for the polymerization inhibitor is favorable in terms of yield, reasonable degree of inhibition of polymerization, and economics.

The above production process is also preferably conducted in the presence of a basic compound as well as the radical polymerization inhibitor. As the basic compound, the compounds to be mentioned hereinafter are preferred and can be used either each independently or in a combination of two or more species.

The level of addition of said basic compound depends on the species of the starting material hydroxyl group-containing vinyl ether and the product vinyl ether group-containing (meth)acrylic ester of general formula (1) but, based on said hydroxyl group-containing vinyl ether, the basic compound can be used at the level of preferably not less than 0.0001 mass %, more preferably not less than 0.0002 mass %, still more preferably not less than 0.0005 mass %, most preferably not less than 0.001 mass %. It is also preferably not more than 5 mass %, more preferably not more than 1 mass %, still more preferably not more than 0.5 mass %, most preferably not more than 0.1 mass %. The above range for the basic compound is favorable in terms of yield, reasonable degree of inhibition of polymerization, and economics.

The preferred mode of reaction for the production of the vinyl ether group-containing (meth)acrylic ester according to the invention further includes the mode in which said hydroxyl group-containing vinyl ether of general formula (2) and said (meth)acrylic ester of general formula (3) are reacted (1) in the presence of not more than 5 mass % of moisture, (2) in an atmosphere having a molecular oxygen concentration of 0.01 to 10 volume %, (3) in a shade device, and (4) in a shade device, the gas phase of which is an atmosphere having a molecular oxygen concentration of 0.01 to 15 volume %.

The method of producing the reactive diluent composition according to the invention is preferably such that the vinyl ether group-containing (meth)acrylic ester of the general formula (1) is produced and purified as in the method (2) described hereinbefore so as to give a reactive diluent composition containing not only this objective vinyl ether group-containing (meth)acrylic ester but also the hydroxyl group-containing vinyl ether of general formula (2) and/or the divinyl ether of general formula (5) which is by-produced in the course of transesterification and/or purification. The preferred method of purification is distillation.

Since the reactive diluent composition of the invention comprises a vinyl ether group-containing (meth)acrylic ester having both a radical-curable group and a cationic-curable group within each molecule, it can be used with advantage as a reactive diluent for curable resins having at least one kind of polymerizable group which can be cured by heat or irradiation with an activated energy ray. The curable resin composition comprising the reactive diluent composition of the invention and a curable resin as provided by the invention is one of the preferred embodiments of the present invention. As to the curable resin, one or more species can be employed.

The term "curable resin" as used in this specification means a curable macromonomer or prepolymer having a polymerizable group which cures on exposure to heat and/or an activated energy ray such as ultraviolet ray, an electron beam, gamma ray, or the like. As such curable resin, a macromonomer or prepolymer having a radically-polymerizable group and/or an ionically-polymerizable group can be employed.

The viscosity of said curable resin is preferably not lower than 1.5 Pa·s at 25° C. and not higher than 100,000 Pa·s at 80° C. If the viscosity is less than 1.5 Pa·s at 25° C., the thixotropy necessary for prevention of sagging in coating and other applications may not be easily obtained. On the other hand, if it exceeds 100,000 Pa·s at 80° C., the high viscosity tends to adversely affect the coating workability. The lower limit is more preferably 10 Pa·s at 25° C., still more preferably 50 Pa·s, while the upper limit is more preferably 10,000 Pa·s at 80° C., still more preferably 5,000 Pa·s.

As to the molecular weight of said curable resin, the lower limit is preferably 300 and the upper limit is preferably 1,000,000. If the molecular weight is less than 300, the cured coat tends to be brittle and the thixotropy necessary for prevention of sagging in coating and other applications may not be easily obtained. If it is higher than 1,000,000, the high viscosity tends to adversely affect the coating workability. The upper limit is more preferably 500,000, still more preferably 100,000, and most preferably 50,000. The curable resin for use in the present invention is preferably one having such viscosity and molecular weight. It should be understood that the term "molecular weight" as used for said curable resin means the number average molecular weight.

The macromonomer or prepolymer having the radically-polymerizable group mentioned above includes a variety of polyester (meth)acrylates which can be obtained by reacting a saturated or unsaturated polybasic acid (e.g. maleic acid, succinic acid, adipic acid, phthalic acid, isophthalic acid, terephthalic acid, tetrahydrophthalic acid or the like) or an anhydride thereof and a saturated or unsaturaed polyhydric alcohol (e.g. ethylene glycol, propylene glycol, neopentyl glycol, 1,4-butanediol, 1,6-hexanediol, 3-methyl-1,5-pentanediol, polyethylene glycol, polypropylene glycol, 1,4-dimethylolbenzene, trimethylolpropane, pentaerythritol or the like) with (meth)acrylic acid; urethane poly(meth)acrylates which can be obtained by reacting a saturated or unsaturated polyhydric alcohol (e.g. ethylene glycol, neopentyl glycol, polytetramethylene glycol, polyester polyol, polycaprolactone polyol or the like) and an organic polyisocyanate (e.g. tolylene diisocyanate, isophorone diisocyanate, xylylene diisocyanate or the like) with a hydroxyl group-containing (meth)acrylate (e.g. 2-hydroxyethyl (meth)acrylate, 2-hydroxypropyl (meth)acrylate, 1,4-butanediol mono(meth)acrylate or the like); polysiloxane poly(meth)acrylates which can be obtained by reacting a polysiloxane with (meth)acrylic acid; polyamide poly(meth)acrylates which can be obtained by reacting a polyamide with (meth)acrylic acid; and (meth)acryloyl group-pendant polymers which can be obtained by reacting a vinyl ether group-containing (meth)acrylic ester of general formula (1) with a cationically-polymerizable compound (e.g. a vinyl ether, an alkylene oxide, a glycidyl ether or the like), to mention several of the preferred macromonomers or prepolymers.

The macromonomer or prepolymer having the ionically-polymerizable group mentioned above includes a variety of aromatic epoxy resins, such as novolac epoxy resins (e.g. phenol-novolac epoxy resin, cresol-novolac epoxy resin, bromophenol-novolac epoxy resin, etc.), trisphenolmethane triglycidyl ether, etc. which are obtainable by reacting a polyphenol having at least one aromatic nucleus (e.g. a bisphenol compound or bisphenol compounds such as bisphenol A, bisphenol F, bisphenol S or the like) or its alkylene oxide (e.g. ethylene oxide, propylene oxide, butylene oxide or the like) adduct with epichlorohydrin; alicyclic epoxy resins such as 3,4-epoxycyclohexylmethyl 3,4-epoxycyclohexanecarboxylate, bis(3,4-epoxycyclohexylmethyl) adipate, bis(2,3-epoxycyclopentyl) ether, EHPE-3150 (™, product of DAICEL CHEMICAL INDUSTRIES, LTD.), etc.; aliphatic epoxy resins which can be obtained by reacting a polyhydric alcohol (e.g. ethylene glycol, propylene glycol, 1,4-butanediol, 1,6-hexanediol, glycerol, trimethylolpropane or the like) or its alkylene oxide (e.g. ethylene oxide, propylene oxide, butylene oxide or the like) adduct with epichlorohydrin; vinyl ether group-pendant polymers which can be obtained by reacting a vinyl ether group-containing (meth)acrylic ester of general formula (1) with a radically- or anionically-polymerizable compound (e.g. a (meth)acrylic ester, a vinyl compound or the like); and alicyclic ether-pendant polymers which can be obtained by reacting an alicyclic ether group-containing (meth)acrylic ester (e.g. ethyl-3-(meth)acryloyloxyoxetane or the like) with a radically- or anionically-polymerizable compound (e.g. a (meth)acrylic ester, a vinyl compound or the like), to mention several of the preferred examples.

The macromonomer or prepolymer having both a radically-polymerizable group and an ionically-polymerizable group includes epoxy-poly (meth)acrylates which are obtainable by reacting an epoxy resin (e.g. phenol-novolac epoxy resin, cresol-novolac epoxy resin, bisphenol A epoxy resin, bisphenol F epoxy resin, trisphenolmethane epoxy resin, polybutadiene-modified epoxy resin, alicyclic epoxy resin, brominated phenol-novolac epoxy resin, brominated bisphenol A epoxy resin, amino-containing epoxy resin, or the like) with (meth)acrylic acid; and carboxylic acid-modified epoxy (meth)acrylates which are obtainable by reacting any of said epoxy-(meth)acrylates with a polybasic acid anhydride (e.g. maleic anhydride, succinic anhydride, phthalic anhydride, tetrahydrophthalic anhydride, hexahydrophthalic anhydride or the like), to mention several of the preferred examples.

Among these, the resins containing at least one radically-polymerizable group and/or ionically-polymerizable group are preferred for use as the curable resin in the practice of the invention.

The curable resin composition comprising said curable resin and said reactive diluent composition, wherein the curable resin has at least one radically-polymerizable group and/or ionically-polymerizable group, constitutes the present invention. More preferably, the curable resin contains at least one or more radically-polymerizable group and/or cationically-polymerizable group within each molecule.

The formulating ratio of said reactive diluent composition comprising a vinyl ether group-containing (meth)acrylic ester and a hydroxyl-group containing polymerizable compound, said reactive diluent composition comprising a vinyl ether group-containing (meth)acrylic ester and a divinyl ether, or said reactive diluent composition comprising a vinyl ether group-containing (meth)acrylic ester to said curable resin in the practice of the present invention can be judiciously selected according to the particular species of reactive diluent composition, particular species of curable resin, combination thereof, and the intended application of the curable resin composition. But the lower limit of the formulating amount of any of said reactive diluent compositions relative to 100 parts by mass of said curable resin is preferably 5 parts by mass and the upper limit is preferably 100 parts by mass. If the proportion of the former is less than 5 parts by mass, the curable resin composition may be too viscous to be easily applied as a coating. If it exceeds 100 parts by mass, the polymerization product of the reactive diluent composition may dominate the physical characteristics of the cured artifact of the curable resin composition, leading to undesirable results. The lower limit is more preferably 10 parts by mass, still more preferably 15 parts by mass, particularly preferably 20 parts by mass. The upper limit of formulation is more preferably 95 parts by mass, still more preferably 90 parts by mass, particularly preferably 85 parts by mass.

The viscosity of the curable resin composition for use in the present invention is preferably 0.5 mPa·s to 100,000 mPa·s at 25° C. If it is less than 0.5 mPa·s, a uniform coat thickness may not be obtained. If it exceeds 100,000 mPa·s, the high viscosity tends to adversely affect the coating workability. The lower limit is more preferably 1 mPa·s, still more preferably 2 mPa·s, and the upper limit is more preferably 10,000 mPa·s, still more preferably 5,000 mPa·s.

For improving the shelf life of the reactive diluent composition comprising a vinyl ether group-containing (meth)acrylic ester and a hydroxyl-group containing polymerizable compound, the reactive diluent composition comprising a vinyl ether group-containing (meth)acrylic ester and a divinyl ether, the reactive diluent composition comprising a vinyl ether group-containing (meth)acrylic ester, or the curable resin composition comprising said reactive diluent composition according to the present invention, it is good practice to add a polymerization inhibitor. The polymerization inhibitor can be used one species alone or in combination of two or more species.

As the polymerization inhibitor, the following compounds are suitable.

Quinone series polymerization inhibitors, such as hydroquinone, methoxyhydroquinone, benzoquinone, p-tert-butylcatechol, etc.; alkylphenol series polymerization inhibitors, such as 2,6-di-tert-butylphenol, 2,4-di-tert-butylphenol, 2-tert-butyl-4,6-dimethylphenol, 2,6-di-tert-butyl-4-methylphenol, 2,4,6-tri-tert-butylphenol, etc.; amine series polymerization inhibitors, such as alkylated diphenylamines, N,N'-diphenyl-p-phenylenediamine, phenothiazine, 4-hydroxy-2,2,6,6-tetramethylpiperidine, 4-benzoyloxy-2,2,6,6-tetramethylpiperidine, 1,4-dihydroxy-2,2,6,6-tetramethylpiperidine, 1-hydroxy-4-benzoyloxy-2,2,6,6-tetramethylpiperidine, etc.; and N-oxyl series polymerization inhibitors, such as 2,2,6,6-tetramethylpiperidine-N-oxyl, 4-hydroxy-2,2,6,6-tetramethylpiperidine-N-oxyl, 4-benzoyloxy-2,2,6,6-tetramethylpiperidine-N-oxyl, and so forth.

Among these, hydroquinone, methoxyhydroquinone, benzoquinone, p-tert-butylcatechol, phenothiazine, 2,2,6,6-tetramethylpiperidine-N-oxyl, 4-hydroxy-2,2,6,6-tetramethylpiperidine-N-oxyl or 4-benzoyloxy-2,2,6,6-tetramethylpiperidine-N-oxyl are preferred.

The level of addition of said polymerization inhibitor relative to the reactive diluent composition of the invention is preferably not less than 0.0001 mass % and not more than 5 mass %. If it is less than 0.0001 mass %, no sufficient prolongation of shelf life may be expected. Exceeding 5 mass % may not be rewarded with any further improvement in shelf life but rather may lead to adverse effects and an economic disadvantage. The lower limit is more preferably 0.005 mass %, still more preferably 0.01 mass %, while the upper limit is more preferably 1 mass %, still more preferably 0.1 mass %.

For a further improvement in shelf life, a basic substance is preferably added to the reactive diluent composition of the invention or the curable resin composition containing the reactive diluent composition. As the basic compound, one or more species of compounds can be employed. The following basic compounds are suitable for use.

Alkali (and alkaline earth) metal hydroxides, such as sodium hydroxide, potassium hydroxide, magnesium hydroxide, etc.; alkali (and alkaline earth) metal carbonates, such as sodium hydrogen carbonate, potassium hydrogen carbonate, magnesium hydrogen carbonate, sodium carbonate, potassium carbonate, magnesium carbonate, etc.; alkali (and alkaline earth) metal carboxylates, such as sodium acetate, potassium acetate, magnesium acetate, etc.; alkali (and alkaline earth) metal alkoxides, such as sodium methoxide, sodium ethoxide, potassium methoxide, potassium ethoxide, etc.; ammonia; and amines such as ethylamine, butylamine, ethanolamine, dimethylamine, dibutylamine, diethanolamine, trimethylamine, triethylamine, tributylamine, triethanolamine, tetramethylethylenediamine, aniline, dimethylaniline, pyridine, piperidine, and so forth.

Among these, sodium hydroxide, potassium hydroxide, triethylamine, tributylamine, and triethanolamine are preferred.

The level of addition of said basic compound, based on the reactive diluent composition of the invention, is preferably not less than 0.0001 mass % and not more than 2 mass %. If it is less than 0.0001 mass %, no sufficient prolongation of shelf life may be expected. On the other hand, exceeding 2 mass % may not be rewarded with any further improvement in shelf life but rather lead to adverse effects and an economic disadvantage. The lower limit is more preferably 0.0005 mass %, still more preferably 0.001 mass %, while the upper limit is more preferably 1 mass %, still more preferably 0.1 mass %.

The co-presence of said polymerization inhibitor and said basic substance results in a more effective stabilization of the reactive diluent composition and of the curable resin composition containing the reactive diluent composition. In this case, the level of addition of the polymerization inhibitor and that of the basic compound may respectively be within the above-mentioned ranges.

If necessary, the curable resin composition of the present invention may be supplemented with at least one kind of thermal polymerization initiator and/or photopolymerization initiator with favorable results. It is also good practice to formulate a thermal polymerization accelerator, photosensitizer, a photopolymerization accelerator or the like.

The thermal polymerization initiator mentioned above is preferably a thermal radical polymerization initiator which generates an initiator radical when heated or a thermal cationic polymerization initiator which generates an initiator cation when heated.

The thermal radical polymerization initiator mentioned above includes the following compounds, to mention some preferred examples.

Organic peroxide series initiators, such as methyl ethyl ketone peroxide, cyclohexanone peroxide, acetyl acetate peroxide, 1,1-bis(t-hexylperoxy)cyclohexane, 1,1-bis(t-butylperoxy)-3,3,5-trimethylcyclohexane, 1,1-bis(t-butylperoxy)butane, diisopropylbenzene hydroperoxide, cumene hydroperoxide, t-hexyl hydroperoxide, t-butyl hydroperoxide, di-t-butyl peroxide, lauroyl peroxide, succinic peroxide, benzoyl peroxide, diisopropyl peroxydicarbonate, α,α'-bis(neodecanoylperoxy) diisopropylbenzene, cumyl peroxyneodecanoate, t-hexyl peroxypivalate, t-butyl peroxypivalate, 1,1,3,3-tetramethylbutyl peroxy-2-ethylhexanoate, t-hexyl peroxyisopropylmonocarbonate, t-butyl peroxyisobutyrate, t-butyl peroxymaleate, t-butyl peroxylaurate, t-butyl peroxyisopropylmonocarbonate, t-butyl peroxyacetate, t-butyl peroxybenzoate, bis(t-butylperoxy)isophthalate, 2,5-dimethyl-2,5-bis(m-tolylperoxy)hexane, t-hexyl peroxybenzoate, t-butyltrimethylsilyl peroxide, 3,3',4,4'-tetra(t-butylperoxycarbonyl)benzophenone, 2,3-dimethyl-2,3-diphenylbutane, etc.; and azo initiators, such as 2,2'-azobis(2-methylbutyronitrile), 2,2'-azobisisobutyronitrile, 2,2'-azobis(2,4-dimethylvaleronitrile), 2,2'-azobis(2-methylpropionamidine) dihydrochloride, 2,2'-azobis[2-(5-methyl-2-imidazolin-2-yl)propane] dihydrochloride, 2,2'-azobis[2-(4,5,6,7-tetrahydro-1H-1,3-diazepin-2-yl)-propane] dihydrochloride, 2,2'-azobis[2-(2-imidazolin-2-yl) propane], 2,2'-azobis{2-methyl-N-[1,1-bis(hydroxymethyl)-2-hydroxy-ethyl]propionamide}, 2,2'-azobis(2-methylpropionamide), 2,2'-azobis(2,4,4-trimethylpentane), 2,2'-azobis(2-methylpropane), dimethyl 2,2-azobis(2-methylpropionate), 4,4'-azobis(4-cyanopentanoic acid), 2,2'-azobis[2-(hydroxymethyl)propionitrile], and so forth.

Among these, compounds capable of generating radicals efficiently under the catalytic action of a metal soap and/or an amine compound or the like, such as methyl ethyl ketone peroxide, cyclohexanone peroxide, cumene hydroperoxide, t-butyl peroxybenzoate, benzoyl peroxide, etc., 2,2'-azobisisobutyronitrile, and 2,2'-azobis(2,4-dimethylvaleronitrile) are preferred.

The thermal cationic polymerization initiator mentioned above includes the following compounds, to mention some preferred examples.

Complexes of Lewis acids (e.g. boron trifluoride, titanous chloride, ferrous chloride, ferric chloride, zinc chloride, stannous chloride, stannic chloride, dibutyltin dichloride, tetrabutyltin, triethylaluminum, diethylaluminum chloride, etc.) with an electron-donating compound (e.g. N,N-dimethylformamide, N,N-dimethylacetamide, N-methylpyrrolidone, hexamethylphosphoric triamide, dimethyl sulfoxide, trimethyl phosphate, triethyl phosphate or the like); and compounds obtainable by neutralizing protonic acids (e.g. halogenocarboxylic acids, sulfonic acids, sulfuric monoesters, phosphoric monoesters, phosphoric diesters, polyphosphoric esters, boric monoesters, boric diesters, etc.) with a base (e.g. ammonia, monoethylamine, diethylamine, triethylamine, pyridine, piperidine, aniline, morpholine, cyclohexylamine, monoethanolamine, diethanolamine, triethanolamine, butylamine or the like).

Among these, amine complexes of various protonic acids insure a good pot-life and are, therefore, preferred.

The photopolymerization initiator mentioned above is preferably a photoradical initiator which generates a polymerization initiator radical upon exposure to ray or a cationic initiator which generates a polymerization initiator cation upon exposure to ray.

The photoradical initiator mentioned above includes the following compounds, to mention some preferred examples.

Acetophenone compounds such as diethoxyacetophenone, 2-hydroxy-2-methyl-1-phenylpropan-1-one, benzyl dimethyl ketal, 4-(2-hydroxyethoxy)phenyl-(2-hydroxy-2-propyl)ketone, 1-hydroxycyclohexyl phenyl ketone, 2-methyl-2-morpholino(4-thiomethylphenyl)propan-1-one, 2-benzyl-2-dimethylamino-1-(4-morpholinophenyl)butanone, 2-hydroxy-2-methyl-1-[4-(1-methylvinyl)phenyl] propanone oligomer, etc.; benzoin compounds such as benzoin, benzoin methyl ether, benzoin ethyl ether, benzoin isopropyl ether, benzoin isobutyl ether, etc.; benzophenone compounds such as benzophenone, methyl o-benzoylbenzoate, 4-phenylbenzophenone, 4-benzoyl-4'-methyl-diphenyl sulfide, 3,3',4,4'-tetra(t-butylperoxylcarbonyl)benzophenone, 2,4,6-trimethylbenzophenone, 4-benzoyl-N,N-dimethyl-N-[2-(1-oxo-2-propenyloxy)ethyl]-benzenmethanammonium bromide, (4-benzoylbenzyl)trimethylammonium chloride, etc.; and thioxanthone compounds such as 2-isopropylthioxanthone, 4-isopropylthioxanthone, 2,4-diethylthioxanthone, 2,4-dichlorothioxanthone, 1-chloro-4-propoxythioxanthone, 2-(3-dimethylamino-2-hydroxy)-3,4-dimethyl-9H-thioxanthon-9-one methochloride, and so forth.

The preferred, among these, are acetophenone compounds, benzophenone compounds and acylphosphine oxides. Particularly preferred are 2-hydroxy-2-methyl-1-phenylpropan-1-one and 2-methyl-2-morpholino(4-thiomethylphenyl)propan-1-one.

The photocationic polymerization initiator mentioned above includes the following compounds, to mention some preferred examples.

Arylsulfonium salts such as triphenylsulfonium hexafluorophosphate, triphenylsulfonium hexafluoroantimonate, etc.; and aryliodonium salts, such as diphenyliodonium hexafluoroantimonate, diphenyliodonium hexafluorophosphate, (tolylcumyl)iodonium tetrakis (pentafluorophenyl)borate etc.; and aryldiazonium salts, such as phenyldiazonium tetrafluoroborate and so forth.

The preferred, among these, are arylsulfonium salts and diazonium salts, and particularly preferred is (tolylcumyl) iodonium tetrakis(pentafluorophenyl)borate.

The above polymerization initiators can be used each independently or as a mixture of two or more species.

The total level of addition of the polymerization initiator or initiators relative to the whole curable resin composition of the invention is preferably 0.05 mass % to 20 mass %. If it is less than 0.05 mass %, no sufficient cure may be obtained. Exceeding the level of 20 mass % leads to no further improvement in cured properties but rather may cause adverse effects and an economic disadvantage. The lower limit is more preferably 0.1 mass %, still more preferably 0.2 mass %, while the upper limit is more preferably 15 mass %, still more preferably 10 mass %.

To lower the decomposition temperature of said thermal radical polymerization initiator, there can be used a thermal polymerization accelerator which promotes decomposition of the thermal radical polymerization initiator to effectively generate a radical. The preferred thermal polymerization accelerator includes metal soaps of cobalt, copper, tin, zinc, manganese, iron, zirconium, chromium, vanadium, calcium, potassium, etc., primary, secondary or tertiary amines, quaternary ammonium salts, thiourea compounds, and ketone compounds, and these may be used each alone or in a combination of two or more species. The particularly preferred, among these, are cobalt octoate, cobalt naphthenate, copper octoate, copper naphthenate, manganese octoate, manganese naphthenate, dimethylaniline, triethanolamine, triethylbenzylammonium chloride, di(2-hydroxyethyl)-p-toluidine, ethylenethiourea, acetylacetone, and methyl acetoacetate.

The total level of addition of said thermalpolymerization accelerators based on the whole curable resin composition is preferably not less than 0.001 mass % and not more than 20 mass %. The more preferred range is 0.01 mass % to 10 mass % and the most preferred range is 0.05 mass % to 5 mass %.

The photosensitizer mentioned hereinbefore includes such preferred species as 2-chlorothioxanthone, 2,4-diethylthioxanthone, 2,4-diisopropylthioxanthone, and so forth. The above photosensitizers can be used each independently or as a mixture of two or more species.

The total level of addition of said photosensitizer relative to the whole curable resin composition above mentioned is preferably 0.05 mass % to 20 mass %. If it is less than 0.05 mass %, no sufficient cure maybe obtained. Exceeding the level of 20 mass % leads to no further improvement in cured properties but rather may cause adverse effects and an economic disadvantage. The lower limit is more preferably 0.1 mass %, still more preferably 0.2 mass %, while the upper limit is more preferably 15 mass %, still more preferably 10 mass %.

The photopolymerization accelerator mentioned hereinbefore includes such preferred species as triethanolamine, methyldiethanolamine, triisopropanolamine, methyl p-dimethylaminobenzoate, ethyl p-dimethylaminobenzoate, isoamyl p-dimethylaminobenzoate, 2-n-butoxyethyl p-dimethylaminobenzoate, 2-dimethylaminoethyl benzoate, N,N-dimethylparatoluidine, 4,4'-dimethylaminobenzophenone, 4,4'-diethylaminobenzophenone, and so forth. The preferred, among these, are triethanolamine, methyldiethanolamine and triisopropanolamine. The above photopolymerization accelerators can be used each independently or as a mixture of two or more species.

The total level of addition of said photopolymerization accelerators relative to the whole curable resin composition of the invention is preferably 0.05 mass % to 20 mass %. If it is less than 0.05 mass %, no sufficient cure may be obtained. Exceeding the level of 20 mass % leads to no further improvement in cured properties but rather may cause adverse effects and an economic disadvantage. The lower limit is more preferably 0.1 mass %, still more preferably 0.2 mass %, while the upper limit is more preferably 15 mass %, still more preferably 10 mass %.

When the above-mentioned thermal polymerization initiator, photopolymerization initiator, thermal polymerization accelerator, photosensitizer, photopolymerization accelerator, etc. are added in combination thereof, the total level of addition relative to the whole curable resin composition is preferably not less than 0.05 mass %, more preferably not less than 0.1 mass %, still more preferably not less than 0.2 mass %, and preferably not more than 20 mass %, more preferably not more than 15 mass %, still more preferably not more than 10 mass %.

The reactive diluent composition of the invention and the curable resin composition containing the reactive diluent composition according to the invention may be further supplemented with water for various purposes, such as toxicity attenuation, viscosity control, coloration with a water-based stain, impregnation to polar substrates, improvement of wettability to polar substrate, improvement in curability or improvement in economics. The preferred water content is not less than 0.01 parts by mass and not more than 1000 parts by mass for 100 parts by mass of the reactive diluent composition of the invention or the curable resin composition containing the reactive diluent composition according to the invention. If the water content is below the above range, the favorable effects mentioned above may not be fully attained. If the range is exceeded, an excessively long cure time and a superfluous energy input may be required for the evaporation of water in the curing operation. The more preferred range is 0.02 mass parts to 500 mass parts, and the still more preferred range is 0.05 mass parts to 200 mass parts. As to the form of addition of water, water may be added to the reactive diluent composition or the curable resin composition in advance or after preparation of the curable resin composition containing the reactive diluent composition. Regarding the mode of presence of water in the composition, the composition and water may coexist as a homogeneous system, that is the so-called aqueous composition, or may be a suspension (dispersion) or an emulsion composition.

Further, if necessary, the curable resin composition of the present invention may be supplemented with various additives such as the inorganic filler, nonreactive resin (e.g. acrylic polymers, polyesters, polyurethanes, polystyrenes, poly(vinyl chloride), etc.), organic solvent, color pigment, plasticizer, ultraviolet absorber, antioxidant, delusterant, dye, antifoaming agent, leveling agent, antistatic agent, dispersant, slip agent, surface modifying agent, thixotropic agent, thixotropic auxiliary agent, and so forth. The presence of these additives will not materially affect the effect of the invention. These additives can each be used singly or in a combination of two or more species.

The levels of addition of said additives relative to the whole curable resin composition of the invention depend on the kinds of additives, the object of use of each additive, the intended use of the curable resin composition, and the mode of use of the curable resin composition, among other factors, and can be judiciously selected.

The level of addition of said inorganic filler, for instance, relative to the whole curable resin composition is preferably not less than 1 mass %, more preferably not less than 10 mass %, still more preferably not less than 20 mass %, and preferably not more than 800 mass %, more preferably not more than 600 mass %, still more preferably not more than 500 mass %.

The level of addition of said nonreactive resin, organic solvent, color pigment, plasticizer, or thixotropic agent, for instance, relative to the whole curable composition is preferably not less than 1 mass %, more preferably not less than 5 mass %, still more preferably not less than 10 mass %, and preferably not more than 40 mass %, more preferably not more than 30 mass %, still more preferably not more than 25 mass %.

The level of addition of said ultraviolet absorber, antioxidant, delusterant, dye, antifoaming agent, leveling agent, antistatic agent, dispersant, slip agent, surface modifying agent, or thixotropic auxiliary agent, for instance, relative to the whole curable composition is preferably not less than 0.0001 mass %, more preferably not less than 0.001 mass %, still more preferably not less than 0.01 mass %, and preferably not more than 5 mass %, more preferably not more than 3 mass %, still more preferably not more than 1 mass %.

The curable resin composition of the invention can be obtained by formulating the curable resin, reactive diluent composition and other components such as additives, heating the formulation to dissolve, and admixing. The resulting curable resin composition of the invention can be applied to substrates by the well-known techniques such as hand coating comprising brush coating, etc., roll coating, gravure coating, gravure offset coating, curtain flow coating, reverse coating, screen printing, spray coating, and dipping. The coating weight is preferably not less than 0.2 g/m$^2$, more preferably not less than 0.5 g/m$^2$, and preferably not more than 100 g/m$^2$, more preferably not more than 70 g/m$^2$.

The substrate mentioned above includes metallic substrates such as iron, aluminum, steel sheet, tin-free steel sheet, tinplate, polyethylene terephathalate film-laminated steel sheet, etc.; concrete; shaped products or films of various resins such as polyethylene, polypropylene, polyacrylate, polyethylene terephthalate, polycarbonates, polyamides, polyimides, nylon, poly(vinyl chloride), poly (vinylidene chloride), etc.; a variety of papers inclusive of coated paper such as polyethylene-coated paper, polyethylene terephthalate-coated paper, etc., and uncoated paper; and wood, to mention just a few preferred examples.

The curing of the curable resin composition of the invention can be achieved by heating or irradiation with an activated energy ray, for instance, but in consideration of the characteristics of the curable resin composition, it is a preferred practice to use an activated energy ray, such as an electromagnetic wave, UV ray, visible ray, infrared ray, an electron beam, gamma ray, and so forth. Particularly, ultraviolet ray or an electron beam is preferred because it is conducive to improved flexibility of the cured artifact and improved processing adhesion. Thus, the preferred form of the curable resin composition of the invention is an activated energy ray-curable resin composition which cures on exposure to activated energy rays. The activated energy ray-curable resin composition containing the above-mentioned reactive diluent composition also constitutes the present invention.

In the case where the curing is to be effected with ultraviolet ray, it is good practice to use a ray source covering a wavelength range of 150 to 450 nm. As such a ray source, sunray, a low-pressure mercury vapor lamp, a high-pressure mercury vapor lamp, an ultrahigh-pressure mercury vapor lamp, a metal halide lamp, a gallium lamp, a xenon lamp, or a carbon arc lamp, for instance, can be used with advantage. It is also possible to carry out such an irradiation in combination with heating by infrared rays, far-infrared rays, or a hot current of air, or by high-frequency heating.

The curing with an electron beam can be carried out using an electron beam with an accelerating voltage of preferably not less than 10 kV, more preferably not less than 20 kV, still more preferably not less than 30 kV, and preferably not more than 500 kV, more preferably not more than 300 kV, still more preferably not more than 200 kV. The irradiation dose is preferably not less than 2 kGy, more preferably not less than 3 kGy, still more preferably not less than 5 kGy, and preferably not more than 500 kGy, more preferably not more than 300 kGy, still more preferably not more than 200 kGy. The electron beam can be used in combination with heating by infrared rays, far-infrared rays, a hot current of air or the like, or by high-frequency heating.

The curable resin composition of the present invention can be exploited in a broad range of uses such as adhesives, pressure sensitive adhesives, biological materials, dental materials, optical members, information recording media, optical fiber materials, resist materials, insulators, sealants, inks, inks for ink-jet printing, printing inks, inks for screen printing, paints, casting materials, decorative laminated sheets, WPC, covering materials, photosensitive resin printing plates, dry films, lining materials, construction and building materials, putty, repair materials, flooring materials, pavement gel coatings, overcoatings, molding materials for hand layup, spray-up, pultrusion molding, filament windings, SMC, BMC, etc., sheets, plasma display panel partitionings, high polymer solid electrolytes, and so forth.

The particularly suited fields of use, among these, are inks, inks for ink-jet printing, printing inks, inks for screen printing, paints, optical fiber materials, adhesives, pressure sensitive adhesives, sealants, photosensitive resin printing plates, dry films, molding materials, construction and building materials, and materials for automobiles and other vehicles.

In using the curable resin composition of the invention in the field of paints, it may be supplemented with fillers such as talc, mica, alumina, silica, aluminum trihydroxide, etc. according to needs. In the case of color paints, not only said fillers but also pigments, dyes, dispersants, etc. can be added. The paints so prepared constitute a further preferred embodiment of the present invention. Such paints can be coated onto said various substrates and be cured as needed by heating or irradiation with an activated energy ray such as an electromagnetic wave, UV ray, visible ray, infrared ray, an electron beam, gamma ray, and so on.

In using the curable resin composition of the invention in the field of inks, it can be supplemented with resin or other binders, various fillers, pigments, dyes, dispersants and others. The resulting inks also constitute a further embodiment of the invention. Such inks can be coated onto metal, paper, resin or other substrates and be cured as needed by heating or irradiation with an activated energy ray such as an electromagnetic wave, ultraviolet ray, visible ray, infrared ray, an electron beam, or gamma ray. It is particularly preferable to cure the composition with rays, such as UV ray, visible ray or near-infrared ray.

In using the curable resin composition of the invention in the field of inks for ink-jet printing use, it can be supplemented, as needed, with resin or other binders, various fillers, pigments, dyes, dispersants, electrical conductivity-imparting agents, organic solvents, water, and so forth. The resulting inks for ink-jet printing constitutes a still another preferred embodiment of the invention and are low viscosity, low odor, low skin-irritating, high stability, and highly ray-sensitive activated energy ray-curable inks for ink-jet printing use. Such inks for ink-jet printing use can be coated on metal, paper, resin and other substrates and, as necessary, cured by heating or irradiation with an activated energy ray such as an electromagnetic wave, ultraviolet ray, visible ray, infrared ray, an electron beam or gamma ray. It is particularly preferable to cure the composition with ray, such as UV ray, visible ray or near-infrared ray. Activated energy ray-curable inks for ink-jet printing use, which contain the above reactive diluent composition, also constitute one embodiment of the invention. The binders, various fillers, pigments, dyes, dispersants, electrical conductivity-imparting agents, and organic solvents can each be used one species alone or two or more of species in combination.

The level of use of the reactive diluent composition in the above activated energy ray-curable inks for ink-jet printing use is preferably not less than 10 mass % and not more than 98 mass % per 100 mass % of the activated energy ray-curable ink for ink-jet printing use. The more preferred range is 20 mass % to 95 mass % and the most preferred range is 30 mass % to 90 mass %.

The pigment mentioned above includes, as preferred examples, carbon black, titanium dioxide, calcium carbonate, quinacridone series organic pigments, phthalocyanine series organic pigments, benzimidazolone series organic pigments, isoindolinone series organic pigments, condensed azo series organic pigments, quinophthalone series organic pigments, and isoindolinone series organic pigments. The level of use of the pigment is preferably not less than 0.1 mass % and not more than 20 mass % per 100 mass % of the activated energy ray-curable ink for ink-jet printing use. The more preferred range is 0.5 mass % to 10 mass %. The most preferred range is 1 mass % to 7 mass %.

The dye referred to above includes, as preferred examples, direct dyes such as Direct Black 17, 19 and 32, Chlorazol Black LF, etc.; acid dyes such as Acid Black 2, 7, 24, etc.; basic dyes such as Basic Black 2, Basic Red 1, etc.; and reactive dyes such as Reactive Black 1, 5, 8 and so on. The level of use of the dye is preferably not less than 0.1 mass % and not more than 20 mass % based on 100 mass % of the activated energy ray-curable ink for ink-jet printing use. The more preferred range is 0.5 mass % to 10 mass %, and the most preferred range is 1 mass % to 7 mass %.

The pigment and dye may be used either one of them alone or both together.

The binder referred to above includes, as preferred examples, poly(vinyl chloride) resin, acrylic ester resin, epoxy resin, polyurethane resin, cellulose derivatives, (vinyl chloride-vinyl acetate) copolymer resin, polyamide resin, poly(vinyl acetal) resin, diallyl phthalate resin, (butadiene-acrylonitirle) copolymer resin, acrylic resin, styrene-acrylic resin, styrene-maleic acid resin, rosin-type resin, rosin ester resin, ethylene-vinyl acetate resin, petroleum resin, coumarone-indene resin, terpene phenol resin, phenolic resin, melamine resin, urea resin, and other resins. The level of use of the binder is preferably not more than 30 mass % based on 100 mass % of the activated energy ray-curable ink for ink-jet printing use. The more preferred range is 0.5 mass % to 20 mass %, and the most preferred range is 1 mass % to 10 mass %.

The filler mentioned above includes glass frit, silica microparticles, organic microparticles, and metal microparticles, to mention just a few examples. The level of use of the filler is preferably not more than 30 mass % in 100 mass % of the activated energy ray-curable ink for ink-jet printing. The more preferred range is 2 mass % to 20 mass %, and the most preferred range is 5 mass % to 10 mass %.

The dispersant mentioned above includes polyvinylpyrolidone, polyvinyl alcohol, poly(vinyl acetal), polyacrylic acid, hydroxyl group-containing carboxylic esters, salts of long-chain polyaminoamides with high molecular weight acid esters, salts of high molecular weight polycarboxylic acids, and high molecular weight unsaturated acid esters, to mention but a few preferred examples. The level of use of the dispersant is preferably not more than 10 mass % in 100 mass % of the activated energy ray-curable ink for ink-jet printing use. The more preferred range is 0.05 mass % to 5 mass %, and the most preferred range is 0.5 mass % to 3 mass %.

The electrical conductivity-imparting agent mentioned above need only be a salt soluble in the curable resin composition and includes alkali metal or alkaline earth metal halides, nitrates and thiocyanates. Among these, lithium nitrate, lithium nitrate trioxide, ammonium thiocyanate, and dimethylamine hydrochloride are preferred. The level of use of the electrical conductivity-imparting agent is preferably not more than 10 mass % in 100 mass % of the activated energy ray-curable ink for ink-jet printing. The more preferred range is 0.05 mass % to 5 mass %, and the most preferred range is 0.5 mass % to 3 mass %.

The organic solvent referred to above includes, as preferred examples, alcohol solvents, aromatic hydrocarbon solvents, ketone solvents, ester solvents, aliphatic hydrocarbon solvents, carbitol solvents, and Cellosolve solvents. The level of use of the organic solvent is preferably not more than 50 mass % in 100 mass % of the activated energy ray-curable ink for ink-jet printing use. The more preferred range is 5 mass % to 30 mass %, and the most preferred range is 10 mass % to 20 mass %.

The level of use of said water is preferably not more than 50 mass % in 100 mass % of the activated energy ray-curable ink for ink-jet printing use. The more preferred range is 5 mass % to 30 mass %, and the most preferred range is 10 mass % to 20 mass %.

While the activated energy ray-curable ink for ink-jet printing use according to the invention can be produced by dispersing said reactive diluent composition together with other components as may be required by means of the ordinary dispersing machine such as a sand mill, it is a preferred procedure to prepare a concentrate containing the pigment and other components in high concentrations in advance and blending it with the reactive diluent composition so as to give an activated energy ray-curable ink for ink-jet printing containing the desired components in desired concentrations and having a designed viscosity. Furthermore, this activated energy ray-curable ink for ink-jet printing use is preferably filtered through a filter with a pore diameter of not larger than 3 $\mu$m. More preferably, it is filtered through a filter having a pore diameter of not larger than 1 $\mu$m.

The activated energy ray-curable ink for ink-jet printing use according to the invention preferably has a viscosity at 25° C. of not less than 1.2 mPa·s and not more than 50 mPa·s. The activated energy ray-curable ink for ink-jet printing use which has a viscosity of 1.2 to 50 mPa·s at 25° C. is also one of the preferred embodiments of the present invention. In this embodiment, the species and formulating amounts of said essential and optional components can be freely selected insofar as the viscosity maybe brought into the above-mentioned range. If the viscosity at 25° C. is less than 1.2 mPa·s, the tracking characteristic of discharge at the high-frequency head tends to be adversely affected. If it exceeds 50 mPa·s, the discharge characteristic as such may deteriorate even when the head is provided with a mechanism for reducing the viscosity by heating, with the result that the stability of discharge may become poor and, in some instances, no discharge at all may be obtained. The more preferred range is 1.5 mPa·s to 20 mPa·s.

In using the curable resin composition of the invention in the field of adhesives or pressure sensitive adhesives (hereinafter referred to collectively as "adhesives"), the composition can be supplemented with tackifiers or the like, various fillers, pigments, dyes, dispersants and other additives as necessary. The resulting adhesives constitute one of the preferred embodiments of the invention. Such adhesives are coated on metal, paper, resin or other substrates and cured as needed by heating or irradiation with an activated energy ray such as an electromagnetic wave, ultraviolet ray, visible ray, infrared ray, an electron beam, or gamma ray. It is particularly preferable to cure the composition with ray, such as UV ray, visible ray or near-infrared ray.

In using the curable resin composition of the invention in the field of curable molding materials, the composition can be supplemented with various fillers, pigments, dyes, dispersants, and other components. The curable molding materials thus obtained also constitute one of the preferred embodiments of the invention. Such curable molding materials can be even as they are, or can be used to impregnate reinforcing fibers, such as glass fiber, carbon fiber, aramid fiber, etc., and may be cured and shaped by heating or irradiation with an activated energy ray, such as an electromagnetic wave, ultraviolet ray, visible ray, infrared ray, an electron beam, gamma ray, and so forth. The curing and shaping by heating or with a highly penetrating electron beam or ray, such as visible ray, infrared ray or the like is particularly preferred.

BEST MODE FOR CARRYING OUT THE INVENTION

The following examples illustrate the present invention in further detail. These examples are, however, by no means limitative of the scope of the present invention. It should be noted that all "parts" means "mass parts" unless otherwise indicated.

[Example of Resin Synthesis—1]

A 1L four-necked flask fitted with a stirrer, thermometer, rectification tower, and a nitrogen gas inlet pipe was charged with 245 parts of maleic anhydride, 370 parts of phthalic anhydride, 170 parts of ethylene glycol, and 210 parts of propylene glycol, and the temperature was gradually increased to 200° C. The reaction was further carried out at the same temperature in a nitrogen gas stream for 10 hours. After confirming the distillative removal of 90 parts of the water of condensation, the reaction mixture was cooled to give an unsaturated polyester. This unsaturated polyester was designated as curable resin (1).

[Example of Resin Synthesis—2]

A 1L four-necked flask fitted with a stirrer, thermometer, rectification tower, and a gas inlet pipe was charged with 144 parts of acrylic acid, 370 parts of bisphenol epoxy resin (epoxy equivalent 185) and 2.6 parts of triethylamine and after the temperature was gradually increased to 115° C., the reaction was further carried out at the same temperature in an air stream for 10 hours to give an epoxy methacrylate. The epoxy methacrylate was designated as curable resin (2).

[Example of Resin Synthesis—3]

A 1L four-necked flask fitted with a stirrer, thermometer, rectification tower, and a gas inlet pipe was charged with 348 parts of tolylene diisocyanate and 0.3 parts of dibutyltin dilaurate, and with nitrogen gas being admitted and the temperature maintained at 40° C., 260 parts of hydroxypropyl acrylate was added dropwise over 2 hours at the same temperature. Then, at the same temperature, 141 parts of dipropylene glycol was added dropwise over 2 hours and the reaction was further continued at that temperature for 5 hours to give a urethane acrylate. This urethane acrylate was designated as curable resin (3).

[Example of Resin Synthesis—4]

A 1L four-necked flask fitted with a stirrer, thermometer, rectification tower, and a gas inlet pipe was charged with 108 parts of acrylic acid, 750 parts of a saturated polyester polyol resin (a saturated oligo-ester obtained by condensing 4 mols of diethylene glycol with 3 mols of adipic acid; acid value 3, hydroxyl value 150), 24 parts of p-toluenesulfonic acid, and 300 parts of toluene, and an azeotropic dehydration was carried out in an air stream at 115° C. for 10 hours. After the internal temperature was brought down to room temperature, the reaction mixture was washed with 800 parts of saturated aqueous sodium hydrogen carbonate solution twice and 800 parts of deionized water once and, then, evaporated to dryness under a reduced pressure of 1.333 kPa at 90° C. for 5 hours to give a polyester methacrylate. This polyester methacrylate was designated as curable resin (4).

EXAMPLE 1

Production of a Reactive Diluent Composition

A 2L reaction vessel equipped with a stirrer, a thermometer holder, a liquid charge line, a gas blowing line, and an Oldershaw type rectification tower (10 plates) having a thermometer holder and a vacuum line was charged with 422.9 g of 2-(hydroxyethoxy)ethyl vinyl ether, 801.0 g of ethyl acrylate, 0.4 g of phenothiazine, and 10.0 g of dibutyltin oxide. While 7 volume % oxygen gas (nitrogen balance) was bubbled into the liquid phase, the contents were stirred to mix and the temperature was increased. With temperature of the rectification tower top being maintained at the azeotropic temperature of ethyl acrylate-ethanol, the byproduct ethanol was removed away to out of the reaction system in the form of an ethyl acrylate-ethanol azeotrope solution, and the same quantity of ethyl acrylate as the ethyl acrylate removed was continuously supplied from the liquid charge line. The reaction system was stirred for 8 hours after the start of temperature increase, and the unreacted ethyl acrylate and byproduct ethanol were removed away to out of the reaction system from the tower top at a negative pressure. Then, a reactive diluent composition comprising 548.17 g of 2-(vinyloxyethoxy)ethyl acrylate, 1.64 g of 2-(hydroxyethoxy) ethyl vinyl ether, 1.10 g of diethylene glycol divinyl ether, and 0.55 g of diethylene glycol diacrylate was recovered from the tower top.

This operation was carried out in repeats necessary for the examples and comparative examples.

EXAMPLE 2

Production of a Reactive Diluent Composition

Except that the Oldershaw type rectification tower (10 plates) was switched to an Oldershaw type rectification tower (20 plates), the procedure of Example 1 was otherwise repeated to recover a reactive diluent composition comprising 518.38 g of 2-(vinyloxyethoxy)ethyl acrylate and 1.56 g of 2-(hydroxyethoxy)ethyl vinyl ether from the tower top.

This operation was carried out in repeats necessary for examples and comparative examples.

PREPARATION EXAMPLE 1

The reactive diluent composition obtained in Example 1, 100 g, was subjected to silica gel column chromatography using mixed solvent of hexane/acetone=98/2 (v/v) as the eluent to give 68.3 g of pure 2-(vinyloxyethoxy)ethyl acrylate.

This operation was carried out in repeats necessary for examples and comparative examples.

EXAMPLE 3

Except that 801.0 g of methyl methacrylate was used in lieu of ethyl acrylate, the procedure of Example 1 was otherwise repeated to recover a reactive diluent composition comprising 602.29 g of 2-(vinyloxyethoxy)ethyl methacrylate, 1.81 g of 2-(hydroxyethoxy) ethyl vinyl ether, 1.20 g of diethylene glycol divinyl ether, and 0.60 g of diethylene glycol dimethacrylate from the tower top. During the reaction, the temperature of the rectification tower top was maintained at the azeotropic temperature of methyl methacrylate and methanol, and the byproduct methanol was continuously removed in the form of an azeotropic solution with methyl methacrylate and methanol while the same quantity of methyl methacrylate as that removed away to out of the system azeotropically was continuously supplied from the liquid charge line.

This operation was carried out in repeats necessary for examples and comparative examples.

EXAMPLE 4

Production of a Reactive Diluent Composition

Except that an Oldershaw type rectification tower (20 plates) was used in lieu of the Oldershaw type rectification tower (10 plates), the procedure of Example 3 was otherwise repeated to obtain a reactive diluent composition comprising 570.25 g of 2-(vinyloxyethoxy) ethyl methacrylate and 1.71 g of 2-(hydroxyethoxy)ethyl vinyl ether from the tower top.

This operation was carried out in repeats necessary for examples and comparative examples.

PREPARATION EXAMPLE 2

A 100 g aliquot of the reactive diluent composition obtained in Example 3 was subjected to silica gel column chromatography using mixed solvent of hexane/acetone= 98/2 (v/v) as the eluent to obtain 71.1 g of pure 2-(vinyloxyethoxy)ethyl methacrylate.

This operation was carried out in repeats necessary for examples and comparative examples.

EXAMPLE 5

Except that 371.7 g of 4-hydroxybutyl vinyl ether was used in lieu of 2-(hydroxyethoxy) ethyl vinyl ether, the procedure of Example 1 was otherwise repeated to recover a reactive diluent composition comprising 506.54 g of 4-vinyloxybutyl acrylate, 1.52 g of 4-hydroxybutyl vinyl ether, 1.01 g of 1,4-butanediol divinyl ether, and 0.51 g of 1,4-butanediol diacrylate from the tower top.

This operation was carried out in repeats necessary for examples and comparative examples.

PREPARATION EXAMPLE 3

A 100 g aliquot of the reactive diluent composition obtained in Example 5 was subjected to silica gel column chromatography using mixed solvent of hexane/acetone= 98/2 (v/v) as the eluent to obtain 74.2 g of pure 4-vinyloxybutyl acrylate.

This operation was carried out in repeats necessary for examples and comparative examples.

EXAMPLE 6

Except that 801.0 g of methyl methacrylate was used in lieu of ethyl acrylate, the procedure of Example 5 was otherwise repeated to recover a reactive diluent composition comprising 560.07 g of 4-vinyloxybutyl methacrylate, 1.68 g of 4-hydroxybutyl vinyl ether, 1.12 g of 1,4-butanediol divinyl ether, and 0.56 g of 1,4-butanediol dimethacrylate from the tower top.

This operation was carried out in repeats necessary for examples and comparative examples.

PREPARATION EXAMPLE 4

A 100 g aliquot of the reactive diluent composition obtained in Example 6 was subjected to silica gel column chromatography using mixed solvent of hexane/acetone= 98/2 (v/v) as the eluent to obtain 70.8 g of pure 4-vinyloxybutyl methacrylate.

This operation was carried out in repeats necessary for examples and comparative examples.

EXAMPLE 7

Production of Reactive Diluent Compositions

The reactive diluent composition obtained in Example 1 was supplemented with the polymerization inhibitor and basic compound according to the prescriptions shown in Table 1 to produce reactive diluent compositions a and b.

EXAMPLE 8

Production of a Reactive Diluent Composition

The reactive diluent composition obtained in Example 2 was supplemented with the polymerization inhibitor according to the prescription shown in Table 1 to produce a reactive diluent composition c.

EXAMPLE 9

Production of Reactive Diluent Compositions

The 2-(vinyloxyethoxy)ethyl acrylate obtained in Preparation Example 1 was supplemented respectively with the hydroxyl group-containing polymerizable compound, divinyl ether, di(meth)acrylate, and polymerization inhibitor according to the prescriptions shown in Table 1 to produce reactive diluent compositions d, e, f and g.

EXAMPLE 10

Production of Reactive Diluent Compositions

The reactive diluent composition obtained in Example 3 was supplemented with the polymerization inhibitor and basic compound according to the prescriptions shown in Table 1 to produce reactive diluent compositions h and i.

EXAMPLE 11

Production of a Reactive Diluent Composition

The reactive diluent composition obtained in Example 4 was supplemented with the polymerization inhibitor according to the prescription shown in Table 1 to produce a reactive diluent composition j.

EXAMPLE 12

Production of Reactive Diluent Compositions

The 2-(vinyloxyethoxy)ethyl methacrylate obtained in Preparation Example 2 was supplemented respectively with the hydroxyl group-containing polymerizable compound, divinyl ether, di(meth)acrylate, and polymerization inhibitor according to the prescriptions shown in Table 1 to produce reactive diluent compositions k, l, m and n.

EXAMPLE 13

Production of a Reactive Diluent Composition

The reactive diluent composition obtained in Example 5 was supplemented with the polymerization inhibitor according to the prescription shown in Table 1 to produce a reactive diluent composition o.

EXAMPLE 14

Production of a Reactive Diluent Composition

The reactive diluent composition obtained in Example 6 was supplemented with the polymerization inhibitor according to the prescription shown in Table 1 to produce a reactive diluent composition p.

COMPARATIVE EXAMPLE 1

Production of Reference Reactive Diluent Compositions

The pure vinyl ether group-containing (meth)acrylic esters obtained in Preparation Examples 1 to 4 were respectively supplemented with the polymerization inhibitor according to the prescriptions shown in Table 2 to prepare reference reactive diluent compositions, viz. Compar.-a, Compar.-b, Compar.-c, and Compar.-d.

COMPARATIVE EXAMPLE 2

Production of Reference Reactive Diluent Compositions

The divinyl ether, di(meth)acrylate, and polymerization inhibitor were admixed according to the prescriptions shown in Table 3 to produce reference reactive diluent compositions, viz. Compar.-e and Compar.-f.

TABLE 1

| Reactive diluent composition | a | b | c | d | e | f | g | h |
|---|---|---|---|---|---|---|---|---|
| Vinyl ether group containing (meth)acrylic ester | VEEA | VEEA | VEEA | VEEA | VEEA | VEEA | VEEA | VEEM |
| (mass parts) | 100 | 100 | 100 | 100 | 100 | 100 | 100 | 100 |
| Hydroxyl group containing polymerizable compound | DEGV | DEGV | DEGV | DEGV | — | DEGV | DEGV | DEGV |
| (mass parts) | 0.3 | 0.3 | 0.3 | 0.3 | — | 0.3 | 0.3 | 0.3 |
| Divinyl ether | DEGDV | DEGDV | — | — | DEGDV | DEGDV | — | DEGDV |
| (mass parts) | 0.2 | 0.2 | — | — | 0.2 | 0.2 | — | 0.2 |
| Di(meth)acrylate | DEGDA | DEGDA | — | — | — | — | DEGDM | DEGDM |
| (mass parts) | 0.1 | 0.1 | — | — | — | — | 0.1 | 0.1 |
| Polymerization inhibitor | MHQ | MHQ | MHQ | MHQ | MHQ | MHQ | MHQ | MHQ |
| (mass parts) | 0.02 | 0.02 | 0.02 | 0.02 | 0.02 | 0.02 | 0.02 | 0.02 |
| Basic compound | — | TBA | — | — | — | — | — | — |
| (mass parts) | — | 0.005 | — | — | — | — | — | — |

| Reactive diluent composition | i | j | k | l | m | n | o | p |
|---|---|---|---|---|---|---|---|---|
| Vinyl ether group containing (meth)acrylic ester | VEEM | VEEM | VEEM | VEEM | VEEM | VEEM | VBA | VBM |
| (mass parts) | 100 | 100 | 100 | 100 | 100 | 100 | 100 | 100 |
| Hydroxyl group containing polymerizable compound | DEGV | DEGV | DEGV | — | DEGV | DEGV | BDV | BDV |
| (mass parts) | 0.3 | 0.3 | 0.3 | — | 0.3 | 0.3 | 0.3 | 0.3 |
| Divinyl ether | DEGDV | — | — | DEGDV | DEGDV | — | BDDV | BDDV |
| (mass parts) | 0.2 | — | — | 0.2 | 0.2 | — | 0.2 | 0.2 |
| Di(meth)acrylate | DEGDM | — | — | — | — | DEGDM | BDDA | BDDM |
| (mass parts) | 0.1 | — | — | — | — | 0.1 | 0.1 | 0.1 |
| Polymerization inhibitor | MHQ | MHQ | MHQ | MHQ | MHQ | MHQ | MHQ | MHQ |
| (mass parts) | 0.02 | 0.02 | 0.02 | 0.02 | 0.02 | 0.02 | 0.02 | 0.02 |
| Basic compound | TBA | — | — | — | — | — | — | — |
| (mass parts) | 0.005 | — | — | — | — | — | — | — |

TABLE 2

| Reference diluent | Compar.-a | Compar.-b | Compar.-c | Compar.-d |
|---|---|---|---|---|
| Vinyl ether group-containing (meth)acrylic ester | VEEA | VEEM | VBA | VBM |
| (mass parts) | 100 | 100 | 100 | 100 |
| Polymerization inhibitor | MHQ | MHQ | MHQ | MHQ |
| (mass parts) | 0.02 | 0.02 | 0.02 | 0.02 |

TABLE 3

| Reference diluent | Compar.-e | Compar.-f |
|---|---|---|
| Divinyl ether | DEGDV | DEGDV |
| (mass parts) | 50 | 50 |
| Di(meth)acrylate | DEGDA | DEGDM |
| (mass parts) | 50 | 50 |
| Polymerization inhibitor | MHQ | MHQ |
| (mass parts) | 0.02 | 0.02 |

Remarks on Table 1, Table 2 and Table 3

Referring to the vinyl ether group-containing (meth) acrylic ester, VEEA means 2-(vinyloxyethoxy)ethyl acrylate, VEEM means 2-(vinyloxyethoxy)ethyl methacrylate, VBA means 4-vinyloxybutyl acrylate, and VBM means 4-vinyloxybutyl methacrylate. Referring to the hydroxyl group-containing polymerizable compound, DEGV means 2-(hydroxyethoxy)ethyl vinyl ether and BDV means 4-hydroxybutyl vinyl ether. Referring to the divinyl ether, DEGDV means diethylene glycol divinyl ether and BDDV means 1,4-butanediol divinyl ether. Referring to the di(meth)acrylate, DEGDA means diethylene glycol diacrylate, DEGDM means diethylene glycol dimethacrylate, BDDA means 1,4-butanediol diacrylate, and BDDM means 1,4-butanediol dimethacrylate. Referring to the polymerization inhibitor, MHQ means methoxyhydroquinone. Referring to the basic compound, TBA means tributylamine.

EXAMPLES 15 TO 74 AND COMPARATIVE EXAMPLES 3 TO 14

The reactive diluent composition, curable resin (1) to (4), polymerization initiator, etc. were formulated to prepare curable resin compositions and the curability and cured physical properties of each composition were determined. The respective prescriptions and results are summarized in Tables 4 to 10. The methods for determination of various physical properties are described below.

(UV Curability)

Using a bar coater, each curable resin composition was coated over a glass panel (size: 150 mm×100 mm) in a thickness of 100 μm, and the coat was UV-cured using a UV irradiator (manufactured by Ushio Inc., trade name PM25C-100, 250W ultrahigh-pressure mercury vapor lamp, dominant wavelength 365 nm). The surface tackiness of the coat was checked by finger-touch in each 0.05 J/cm$^2$ steps of irradiation energy and the irradiation energy required till loss of tack was determined.

(Heat Curability)

Using a bar coater, each curable resin composition was coated over a glass panel (size: 150 mm×100 mm) in a thickness of 100 μm and allowed to stand in a dryer at 40° C. The surface tackiness of the coat was checked by finger-touch every 30 seconds and the time required till loss of tack was determined.

(Solvent Resistance)

The coat cured with an irradiation energy of 3.5 J/cm$^2$ or the coat cured on 30 minutes' standing at 40° C. was rubbed against using acetone-soaked gauze 10 times per session for a total of 50 times and the change in surface gloss was visually evaluated (one reciprocating stroke of the gauze was reckoned as one time). The evaluation criteria: 0 no change in gloss, Δ a slight decrease in gloss, and X a complete loss of gloss.

(Pencil Hardness)

The coat cured with irradiation energy of 3.5 J/cm$^2$ or the coat cured on 30 minutes' standing at 40° C. was tested for pencil hardness in accordance with JIS K-5400.

TABLE 4

| Example | 15 | 16 | 17 | 18 | 19 | 20 | 21 | 22 |
|---|---|---|---|---|---|---|---|---|
| Reactive diluent composition No. (mass parts) | a 100 | b 100 | c 100 | d 100 | e 100 | f 100 | g 100 | h 100 |
| IRGACURE 907 (mass parts) | 2 | 2 | 2 | 2 | 2 | 2 | 2 | 2 |
| UV curability (J/cm$^2$) | 0.25 | 0.30 | 0.35 | 0.35 | 0.35 | 0.30 | 0.30 | 2.00 |
| Solvent resistance | ○ | ○ | ○ | ○ | ○ | ○ | ○ | ○ |
| Pencil hardness | F | F | F | F | F | F | F | H |
| Example | 23 | 24 | 25 | 26 | 27 | 28 | 29 | 30 |
| Reactive diluent composition No. (mass parts) | i 100 | j 100 | k 100 | l 100 | m 100 | n 100 | o 100 | p 100 |
| IRGACURE 907 (mass parts) | 2 | 2 | 2 | 2 | 2 | 2 | 2 | 2 |
| UV curability (J/cm$^2$) | 2.05 | 2.10 | 2.10 | 2.10 | 2.05 | 2.05 | 0.20 | 1.85 |
| Solvent resistance | ○ | ○ | ○ | ○ | ○ | ○ | ○ | ○ |
| Pencil hardness | H | H | H | H | H | H | H | 2H |

TABLE 5

| Example | 31 | 32 | 33 | 34 | 35 | 36 | 37 | 38 | 39 | 40 | 41 | 42 |
|---|---|---|---|---|---|---|---|---|---|---|---|---|
| Reactive diluent composition (mass parts) | a 100 | a 100 | a 100 | c 100 | c 100 | c 100 | f 100 | f 100 | f 100 | h 100 | h 100 | h 100 |
| IRGACURE 907 (mass parts) | — | 2 | — | — | 2 | — | — | 2 | — | — | 2 | — |
| Rhodorsil 2074 (mass parts) | 0.5 | 0.5 | — | 0.5 | 0.5 | — | 0.5 | 0.5 | — | 0.5 | 0.5 | — |
| 8% cobalt octoate solution (mass parts) | — | — | 0.2 | — | — | 0.2 | — | — | 0.2 | — | — | 0.2 |
| Kayacumene H (mass parts) | — | — | 0.2 | — | — | 0.2 | — | — | 0.2 | — | — | 0.2 |
| Kayabutyl Z (mass parts) | — | — | 0.8 | — | — | 0.8 | — | — | 0.8 | — | — | 0.8 |
| UV curability (J/cm$^2$) | 0.30 | 0.20 | — | 0.40 | 0.30 | — | 0.35 | 0.25 | — | 1.80 | 1.50 | — |
| Heat curability (min.) | — | — | 12.0 | — | — | 13.0 | — | — | 12.0 | — | — | 15.0 |
| Solvent resistance | ○ | ○ | ○ | ○ | ○ | ○ | ○ | ○ | ○ | ○ | ○ | ○ |
| Pencil hardness | F | F | F | F | F | F | F | F | F | H | H | H |

TABLE 6

| Comparative Example | 3 | 4 | 5 | 6 | 7 | 8 |
|---|---|---|---|---|---|---|
| Reactive diluent composition (mass parts) | Compar.-a 100 | Compar.-b 100 | Compar.-c 100 | Compar.-d 100 | Compar.-e 100 | Compar.-f 100 |
| IRGACURE 907 (mass parts) | 2 | 2 | 2 | 2 | 2 | 2 |
| UV curability (J/cm$^2$) | 0.40 | 3.50 | 0.35 | 2.80 | not cured | not cured |
| Solvent resistance | Δ | Δ | ○ | ○ | X | X |
| Pencil hardness | B | B | F | H | — | — |

TABLE 7

| Example | 43 | 44 | 45 | 46 | 47 | 48 | 49 | 50 | 51 | 52 | 53 | 54 | 55 | 56 |
|---|---|---|---|---|---|---|---|---|---|---|---|---|---|---|
| Reactive diluent composition a (mass parts) | 40 | 40 | 40 | 40 | 40 | 40 | 40 | 40 | — | — | — | — | — | — |
| Reactive diluent composition c (mass parts) | — | — | — | — | — | — | — | — | 40 | 40 | 40 | 40 | 40 | 40 |
| Curable resin (1) (mass parts) | 60 | 60 | — | — | — | — | — | — | 60 | 60 | — | — | — | — |
| Curable resin (2) (mass parts) | — | — | 60 | 60 | — | — | — | — | — | — | 60 | 60 | — | — |
| Curable resin (3) (mass parts) | — | — | — | — | 60 | 60 | — | — | — | — | — | — | 60 | 60 |
| Curable resin (4) (mass parts) | — | — | — | — | — | — | 60 | 60 | — | — | — | — | — | — |
| IRGACURE 907 (mass parts) | 2 | — | 2 | — | 2 | — | 2 | — | 2 | — | 2 | — | 2 | — |
| 8% cobalt octoate solution (mass parts) | — | 0.2 | — | 0.2 | — | 0.2 | — | 0.2 | — | 0.2 | — | 0.2 | — | 0.2 |
| Methyl ethyl ketone peroxide (mass parts) | — | 1 | — | — | — | — | — | — | — | 1 | — | — | — | — |
| Kayacumene H (mass parts) | — | — | — | 0.2 | — | 0.2 | — | 0.2 | — | — | — | 0.2 | — | 0.2 |
| Kayabutyl Z (mass parts) | — | — | — | 0.8 | — | 0.8 | — | 0.8 | — | — | — | 0.8 | — | 0.8 |

TABLE 7-continued

| Example | 43 | 44 | 45 | 46 | 47 | 48 | 49 | 50 | 51 | 52 | 53 | 54 | 55 | 56 |
|---|---|---|---|---|---|---|---|---|---|---|---|---|---|---|
| UV curability (J/cm$^2$) | 0.15 | — | 0.15 | — | 0.20 | — | 0.20 | — | 0.20 | — | 0.20 | — | 0.25 | — |
| Heat curability (min.) | — | 8.5 | — | 7.5 | — | 9.0 | — | 9.0 | — | 9.0 | — | 8.0 | — | 9.5 |
| Solvent resistance | ○ | ○ | ○ | ○ | ○ | ○ | ○ | ○ | ○ | ○ | ○ | ○ | ○ | ○ |
| Pencil hardness | H | H | 2H | 2H | B | B | B | B | H | H | 2H | 2H | B | B |

TABLE 8

| Example | 57 | 58 | 59 | 60 | 61 | 62 | 63 | 64 | 65 | 66 | 67 | 68 | 69 | 70 |
|---|---|---|---|---|---|---|---|---|---|---|---|---|---|---|
| Reactive diluent composition c (mass parts) | 40 | 40 | — | — | — | — | — | — | — | — | — | — | — | — |
| Reactive diluent composition f (mass parts) | — | — | 40 | 40 | 40 | 40 | 40 | 40 | 40 | 40 | — | — | — | — |
| Reactive diluent composition h (mass parts) | — | — | — | — | — | — | — | — | — | — | 40 | 40 | 40 | 40 |
| Curable resin (1) (mass parts) | — | — | 60 | 60 | — | — | — | — | — | — | 60 | 60 | — | — |
| Curable resin (2) (mass parts) | — | — | — | — | 60 | 60 | — | — | — | — | — | — | 60 | 60 |
| Curable resin (3) (mass parts) | — | — | — | — | — | — | 60 | 60 | — | — | — | — | — | — |
| Curablel resin (4) (mass parts) | 60 | 60 | — | — | — | — | — | — | 60 | 60 | — | — | — | — |
| IRGACURE 907 (mass parts) | 2 | — | 2 | — | 2 | — | 2 | — | 2 | — | 2 | — | 2 | — |
| 8% cobalt octoate solution (mass parts) | — | 0.2 | — | 0.2 | — | 0.2 | — | 0.2 | — | 0.2 | — | 0.2 | — | 0.2 |
| Methyl ethyl ketone peroxide (mass parts) | — | — | 1 | — | — | — | — | — | — | — | — | 1 | — | — |
| Kayacumene H (mass parts) | — | 0.2 | — | 0.2 | — | 0.2 | — | 0.2 | — | 0.2 | — | — | — | 0.2 |
| Kayabutyl Z (mass parts) | — | 0.8 | — | 0.8 | — | 0.8 | — | 0.8 | — | 0.8 | — | — | — | 0.8 |
| UV curability (J/cm$^2$) | 0.25 | — | 0.20 | — | 0.20 | — | 0.25 | — | 0.25 | — | 0.25 | — | 0.40 | — |
| Heat curability (min.) | — | 9.5 | — | 9.0 | — | 9.0 | — | 9.5 | — | 9.5 | — | 6.0 | — | 5.5 |
| Solvent resistance | ○ | ○ | ○ | ○ | ○ | ○ | ○ | ○ | ○ | ○ | ○ | ○ | ○ | ○ |
| Pencil hardness | B | B | H | H | 2H | 2H | B | B | B | B | 2H | 2H | 3H | 3H |

TABLE 9

| Example | 71 | 72 | 73 | 74 |
|---|---|---|---|---|
| Reactive diluent composition c (mass parts) | 40 | 40 | 40 | 40 |
| Curable resin (3) (mass parts) | 60 | 60 | — | — |
| Curable resin (4) (mass parts) | — | — | 60 | 60 |
| IRGACURE 907 (mass parts) | 2 | — | 2 | — |
| 8% cobalt octoate solution (mass parts) | — | 0.2 | — | 0.2 |
| Kayacumene H (mass parts) | — | 0.2 | — | 0.2 |
| Kayabutyl Z (mass parts) | — | 0.8 | — | 0.8 |
| UV curability (J/cm$^2$) | 0.35 | — | 0.40 | — |
| Heat curability (min.) | — | 7.0 | — | 7.5 |
| Solvent resistance | ○ | ○ | ○ | ○ |
| Pencil hardness | H | H | H | H |

TABLE 10

| Comparative Example | 9 | 10 | 11 | 12 | 13 | 14 |
|---|---|---|---|---|---|---|
| Compar.-a (mass parts) | 40 | — | — | — | — | — |
| Compar.-b (mass parts) | — | 40 | — | — | — | — |
| Compar.-c (mass parts) | — | — | 40 | — | — | — |
| Compar.-d (mass parts) | — | — | — | 40 | — | — |
| Compar.-e (mass parts) | — | — | — | — | 40 | — |
| Compar.-f (mass parts) | — | — | — | — | — | 40 |
| Curable resin (4) (mass parts) | 60 | 60 | 60 | 60 | 60 | 60 |
| IRGACURE 907 (mass parts) | 2 | 2 | 2 | 2 | 2 | 2 |
| UV curability (J/cm$^2$) | 0.50 | 0.55 | 0.45 | 0.55 | 2.00 | 3.50 |
| Solvent resistance | X | X | Δ | Δ | X | X |
| Pencil hardness | 4B | 3B | 2B | 2B | 6B | 6B |

Remarks on Tables 4 to 10

IRGACURE 907 is a photoradical polymerization initiator manufactured by Ciba Specialty Chemicals, i.e. 2-methyl-2-morpholino (4-thiomethylphenyl)propan-1-one; Rhodorsil 2074 is a photocationic polymerization initiator manufactured by Rhodia Japan, i.e. (tolylcumyl)iodonium tetrakis(pentafluorophenyl)borate; Kayacumene H is a thermal radical polymerization initiator manufactured by Kayaku Akzo, i.e. cumene hydroperoxide; Kayabutyl Z is a thermal radical polymerization initiator manufactured by Kayaku Akzo, i.e. t-butyl peroxybenzoate; and 8% cobalt-octoate solution is a mineral spirit solution containing 8 mass % of the cobalt compound.

EXAMPLE 75

The reactive diluent composition a, 80 parts, shown in Table 1 was thoroughly mixed with 10 parts of trimethylolpropane triacrylate, 5 parts of Chlorazol Black LF, and 5 parts of IRGACURE 907 (product of Ciba Specialty Chemicals, 2-methyl-2-morpholino(4-thiomethylphenyl) propan-1-one) in a mixer to prepare an ink for ink-jet printing. The viscosity of this ink at 25° C. as measured with a Type E viscometer (manufactured by Toki Sangyo, trade name TOKIMEC VISCOMETER TV-20) was 4.2 mPa·s.

The ink thus obtained was printed on a paper, PET or metal substrate using a printer equipped with a piezo head and cured at an energy dose of 100 mJ/cm$^2$ using a UV irradiator (a 250W ultrahigh-pressure mercury vapor lamp). When the print on each substrate was checked for tackiness by finger-touch, no tack was felt. There was no adherence of the ink to the finger, either. Moreover, dripping a few drops of methanol onto the print on each substrate caused no bleeding of the ink image.

EXAMPLE 76

Using a high-speed mixer, 80 parts of the reactive diluent composition a shown in Table 1 was thoroughly stirred and dispersed with 10 parts of trimethylolpropane triacrylate, 5 parts of carbon black, 1 part of styrene-maleic acid copolymer, and 5 parts of IRGACURE 907 (product of Ciba Specialty Chemicals, 2-methyl-2-morpholino(4-thiomethylphenyl)propan-1-one) to prepare an ink for ink-jet printing. The viscosity of this ink at 25° C. as measured with a Type E viscometer (TOKIMEC VISCOMETER TV-20) was 6.7 mPa·s.

The ink thus obtained was printed on paper, PET or metal substrate using a printer equipped with a piezo head and cured using a UV irradiator (a 250W ultrahigh-pressure mercury vapor lamp) at an irradiation energy of 100 mJ/cm². When the resulting print on each substrate was checked for tackiness by finger-touch, no tack was felt and there was no adherence of the ink to the finger, either. Moreover, dripping a few drops of methanol onto the print on each substrate caused no bleeding of the ink image.

EXAMPLE 77

Using a mixer, 80 parts of the reactive diluent composition a shown in Table 1 was thoroughly mixed with 10 parts of the curable resin (2), 5 parts of Chlorazol Black LF and 5 parts of IRGACURE 907 (product of Ciba Specialty Chemicals, 2-methyl-2-morpholino(4-thiomethylphenyl)propan-1-one) to give an ink for ink-jet printing. The viscosity of this ink at 25° C. as measured with a Type E viscometer (TOKIMEC VISCOMETER TV-20) was 20 mPa·s.

This ink was printed on paper, PET or metal substrate using a printer equipped with a piezo head and cured using a UV irradiator (a 250W ultrahigh-pressure mercury vapor lamp) at an energy output of 100 mJ/cm². When the print on each substrate was checked for tackiness by finger-touch, no tack was felt and there was no adherence of the ink to the finger, either. Moreover, dripping a few drops of methanol onto the print on each substrate caused no bleeding of the ink image.

INDUSTRIAL APPLICABILITY

The present invention which, constituted as above, comprises using a reactive diluent composition comprising a vinyl ether group-containing (meth)acrylic ester and a hydroxyl group-containing polymerizable compound or a reactive diluent composition comprising a vinyl ether group-containing (meth)acrylic ester as produced by a transesterification reaction is capable of overcoming the disadvantages of the radically curable reactive diluent and cationically curable reactive diluent, and finds application in a broad range of uses inclusive of inks, inks for ink-jet printing, printing inks, screen-printing inks, paints, optical fiber materials, adhesives, pressure sensitive adhesives, sealants, photosensitive resin printing plates, dry films, and molding materials. Furthermore, a curable resin composition, such as an activated energy ray-curable resin composition, which contains the reactive diluent composition of the invention finds application in a variety of fields, such as inks, inks for ink-jet printing, printing inks, screen-printing inks, paints, optical fiber materials, adhesives, pressure sensitive adhesives, sealants, photosensitive resin printing plates, dry films, molding materials, and so forth.

What is claimed is:

1. A reactive diluent composition comprising a vinyl ether group-containing (meth) acrylic ester represented by the following general formula (1):

$$CH_2=CR^1-COO-R^2-O-CH=CH-R^3 \quad (1)$$

wherein $R^1$ represents a hydrogen atom or a methyl group; $R^2$ represents an organic residue of 2 to 20 carbon atoms; $R^3$ represents a hydrogen atom or an organic residue of 1 to 11 carbon atoms and a hydroxyl group-containing polymerizable compound, wherein the proportion of said hydroxyl group-containing polymerizable compound relative to 100 mass parts of said vinyl ether group-containing (meth) acrylic ester is not less than 0.001 mass parts and not more than 100 mass parts.

2. A reactive diluent composition comprising a vinyl ether group-containing (meth) acrylic ester represented by the following general formula (1):

$$CH_2=CR^1-COO-R^2-O-CH=CH-R^3 \quad (1)$$

wherein $R^1$ represents a hydrogen atom or a methyl group; $R^2$ represents an organic residue of 2 to 20 carbon atoms; $R^3$ represents a hydrogen atom or an organic residue of 1 to 11 carbon atoms and a divinyl ether, wherein the proportion of said divinyl ether relative to 100 mass parts of said vinyl ether group-containing (meth) acrylic ester is not less than 0.001 mass parts and not more than 100 mass parts.

3. A curable resin composition comprising a curable resin and the reactive diluent composition according to claim 1 or 2, said curable resin having at least one radically polmerizable group and/or ionically polymerizable group.

4. An activated energy ray-curable resin composition comprising the reactive diluent composition according to claim 1 or 2.

5. An activated energy ray-curable ink composition for ink-jet printing use which contains the reactive diluent composition according to claim 1 or 2.

* * * * *